(12) United States Patent
Toyoda

(10) Patent No.: US 8,233,201 B2
(45) Date of Patent: Jul. 31, 2012

(54) IMAGE PROCESSING APPARATUS, IMAGE READING APPARATUS, IMAGE FORMING APPARATUS, AND RECORDING MEDIUM

(75) Inventor: Masanori Toyoda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 624 days.

(21) Appl. No.: 12/493,857

(22) Filed: Jun. 29, 2009

(65) Prior Publication Data
US 2009/0323131 A1 Dec. 31, 2009

(30) Foreign Application Priority Data
Jun. 30, 2008 (JP) .................. 2008-171225

(51) Int. Cl.
*H04N 1/04* (2006.01)
(52) U.S. Cl. ........ 358/488; 358/486; 358/483; 358/497; 358/474
(58) Field of Classification Search .......... 358/486, 358/488, 497, 494, 474, 483; 382/312, 318, 382/319, 289; 399/379, 380
See application file for complete search history.

(56) References Cited

U.S. PATENT DOCUMENTS

| | | | | |
|---|---|---|---|---|
| 6,433,896 B1 * | 8/2002 | Ueda et al. | .................. | 358/488 |
| 7,471,424 B2 * | 12/2008 | Ishido et al. | .................. | 358/449 |
| 8,014,044 B2 * | 9/2011 | Shiga et al. | .................. | 358/488 |
| 2010/0020366 A1 * | 1/2010 | Iwaki | .................. | 358/474 |

FOREIGN PATENT DOCUMENTS

| | | |
|---|---|---|
| JP | 8-204912 A | 8/1996 |
| JP | 10-191026 A | 7/1998 |

* cited by examiner

*Primary Examiner* — Cheukfan Lee
(74) *Attorney, Agent, or Firm* — Birch, Stewart, Kolasch & Birch, LLP

(57) ABSTRACT

A copying machine includes a document skew detection section. The document skew detection section includes an angle calculation section and a judgment section. The angle calculation section specifies an angle $\theta_1$ formed between a reference direction and an edge of a document placed on a platen glass, in accordance with first input image data obtained by scanning the document the document being started to be scanned when an angle formed between the platen glass and a platen cover is $\gamma°$. Further, the angle calculation section specifies an angle $\theta_2$ formed between the reference direction and the edge of the document, in accordance with second input image data obtained by scanning the document, the document being started to be scanned when the angle formed between the platen glass and the platen cover is 0° Also, the judgment section generates an angular difference $\alpha$ obtained by carrying out an operation of $\theta_1-\theta_2$. This makes it possible that the document which is unintentionally skewed be identified.

15 Claims, 23 Drawing Sheets

| tan θ | θ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| ⋮ | |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

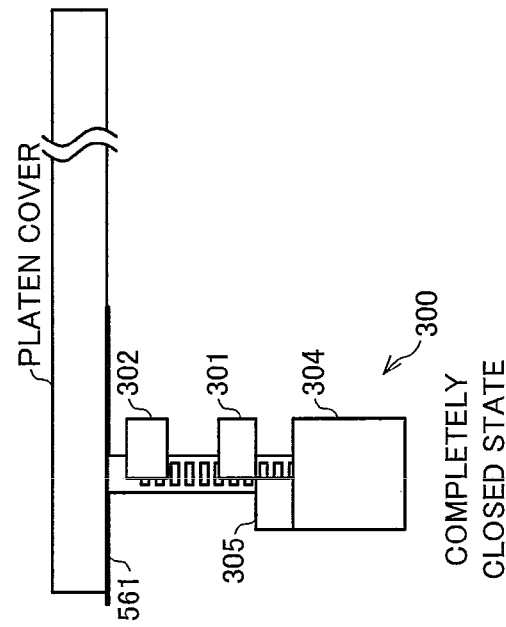
FIG. 17 (c) COMPLETELY CLOSED STATE
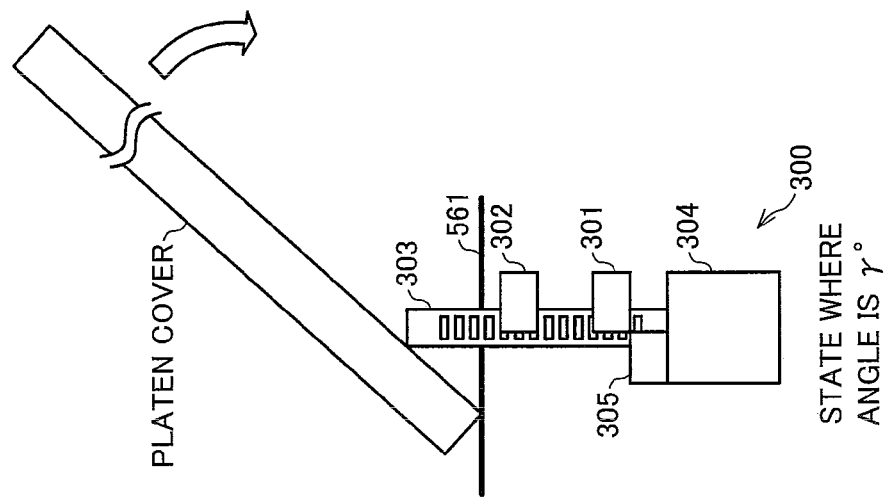
FIG. 17 (b) STATE WHERE ANGLE IS γ°
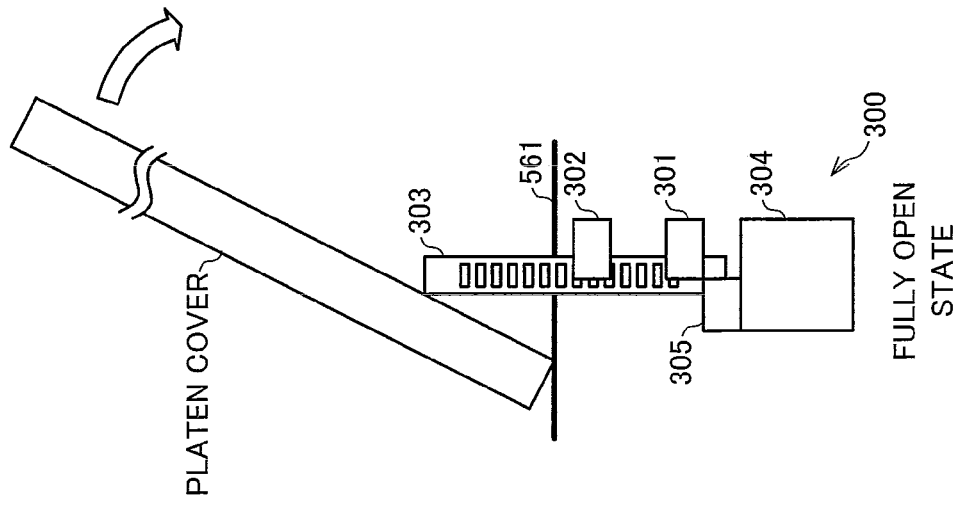
FIG. 17 (a) FULLY OPEN STATE FIG. 18 (a)
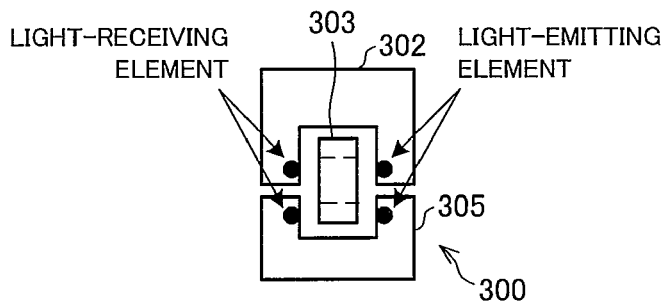
FIG. 18 (b)   FIG. 18 (c)
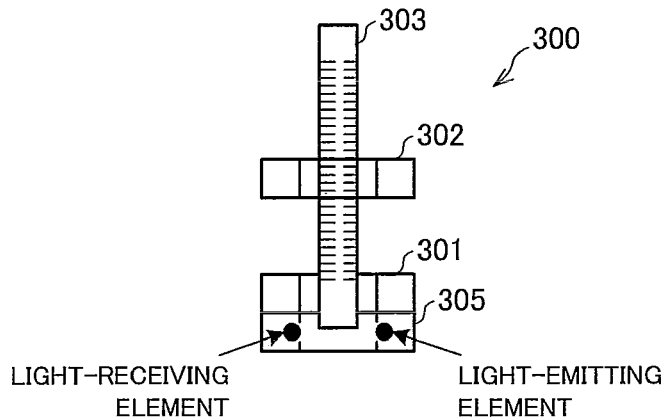 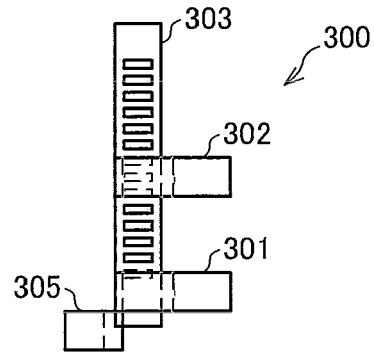
FIG. 19
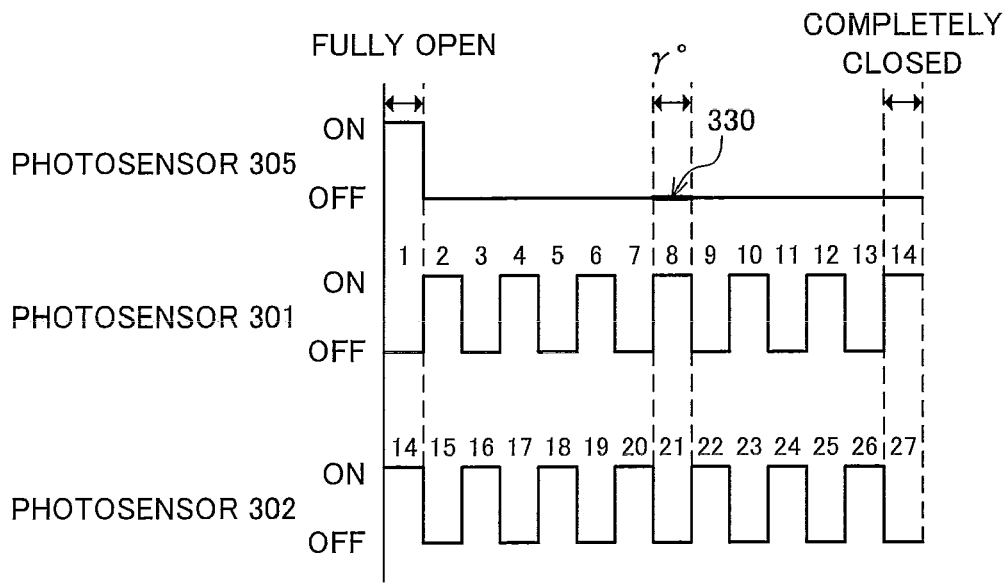

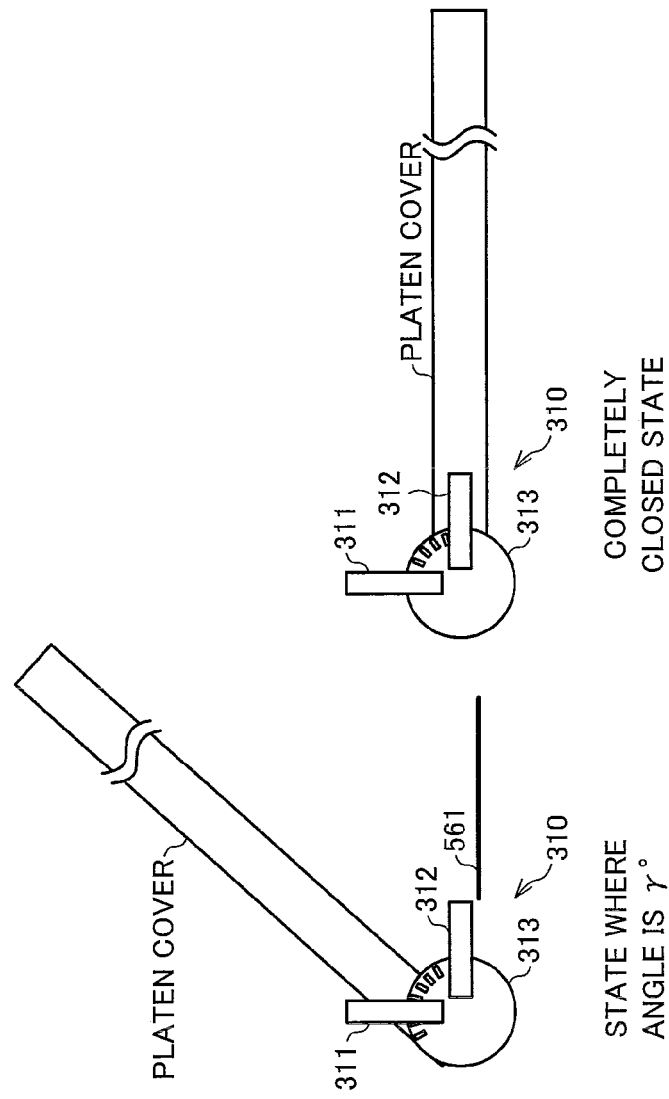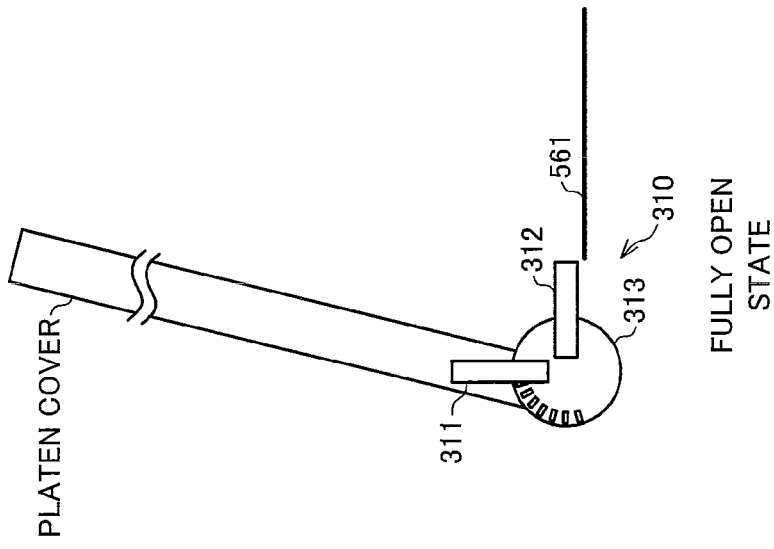

IMAGE PROCESSING APPARATUS, IMAGE READING APPARATUS, IMAGE FORMING APPARATUS, AND RECORDING MEDIUM

This Nonprovisional application claims priority under 35 U.S.C. §119(a) on Patent Application No. 2008-171225 filed in Japan on Jun. 30, 2008, the entire contents of which are hereby incorporated by reference.

FIELD OF THE INVENTION

The present invention relates to an image processing apparatus for processing image data read out by an image reading apparatus such as a scanner or the like, and in particular, to an image processing apparatus for automatically correcting skew in image data read out from a document which is skewed as a platen cover is closed.

BACKGROUND OF THE INVENTION

Processes such as a skew correction process, a noise removal process, a distortion correction process, and the like are carried out in an image processing apparatus for processing a document image read out by an image reading apparatus such as a scanner or the like. The skew correction process is a process for detecting whether the document is skewed or not based on the read image, and correcting document skew in the read image. The noise removal process is a process for removing isolated point noises present in the image. The distortion correction process is a process for correcting, in a case where the document is of a bound book, distortion in an image of a binding section.

For the skew correction process, a Patent Literature 1 below discloses a technique in which a contour of a document is extracted, and document skew (correction of the document skew by an image process) is corrected based on the extracted contour.

CITATION LIST

Patent Literature 1

Japanese Patent Application Publication, Tokukaihei, No. 10-191026 (Publication Date: Jul. 21, 1998)

However, in a case where an image is read out from a skewed document, it is impossible with the technique disclosed by the Patent Literature 1 to judge whether the document is unintentionally skewed (i.e., whether the document is skewed by a wind pressure or shaking caused as the platen cover is closed) or the document is skewed (intentionally) by the user. According to the technique disclosed by the Patent Literature 1, therefore, skew correction is always carried out, without exception, in a case where an image is read out from a skewed document. This causes the skew correction to be carried out to the document which is intentionally skewed by the user, thereby resulting in a case in which unnecessary skew correction may be carried out. As a result, the image is outputted in a form unintended by the user (miscopy is occurred). In view of this, if it can be judged whether the document is unintentionally skewed or not in accordance with an image data read out from the document, it is possible to prevent the unnecessary skew correction from being carried out even in the case where the read document is skewed

SUMMARY OF THE INVENTION

The present invention is made in view of the problem, and an object of the present invention is to provide an image processing apparatus, an image reading apparatus, an image forming apparatus, an image processing method, an image processing program, and a recording medium, each being capable of identifying a document which is unintentionally skewed.

In order to attain the object, the image processing apparatus of the present invention is configured so as to include: a first angle specifying section for specifying a first angle formed between a reference direction and an edge of a document placed on a platen, in accordance with first image data obtained by scanning the document, the document being started to be scanned when a positional relation between the platen and a platen cover for covering the document is in a first state; a second angle specifying section for specifying a second angle formed between the reference direction and the edge of the document, in accordance with second image data obtained by scanning the document, the document being started to be scanned when the positional relation is in a second state where a distance between the platen and platen cover is narrower than in the first state; and an angle information generation section for generating angular information which indicates a degree of a difference between the first and the second angles.

According to the present invention, if the document on the platen is not moved at all as the platen cover is closed, a difference between the first and the second angles is 0, in either case where the document is placed on the platen in such a manner that the edge of the document is set along the reference direction, or where the document is placed on the platen in such a manner that the edge (of the document) is intentionally skewed with respect to the reference direction by the user.

In contrast, if the document on the platen is moved by a wind pressure, shaking, or the like caused as the platen cover is closed (if the document is unintentionally skewed), a difference between the first and the second angles is emerged, in either case where the document is placed on the platen in such a manner that the edge of the document is set along the reference direction, or where the document is placed on the platen in such a manner that the edge (of the document) is intentionally skewed with respect to the reference direction by the user.

With the present invention, it is therefore possible to identify the document which is unintentionally skewed, by referring to the angular information generated by the angular information generation section.

It is to be noted that the angular information is not limited as long as a degree of difference between the first and the second angles is indicated. Examples of the angular information may include: the difference between the first and the second angles itself; a value obtained by rounding the difference between the first and the second angles; and a value obtained by multiplying or dividing the difference between the first and the second angles by a steady value. Further, a ratio between the first and the second angles or the like can be used as the value indicating the difference between the first and the second angles.

For a fuller understanding of the nature and advantages of the invention, reference should be made to the ensuing detailed description taken in conjunction with the accompanying drawings.

BRIEF DESCRIPTION OF THE DRAWINGS

FIG. 9($b$) is a schematic top view of the platen glass of the image input apparatus, showing the case which is shown in FIG. 9($a$).

FIG. 10($b$) is a schematic top view of the platen glass of the image input apparatus, showing the case which is shown in FIG. 10($a$).

FIG. 17($a$) is a schematic view of a linear encoder for calculating an angle formed between the platen glass and a platen cover, showing a case where the platen cover is fully opened.

FIG. 17($b$) is a view of the linear encoder, showing a case where an angle formed between the platen glass and the platen cover is γ°.

FIG. 17($c$) is a view of the linear encoder, showing a case where the platen cover is completely closed.

FIG. 18($a$) is a top view of photosensors and an actuator each being included by the linear encoder shown in FIGS. 17($a$) through 17($c$).

FIG. 18($b$) is an elevation view of the photosensors and the actuator shown in FIG. 18($a$).

FIG. 18($c$) is a side view of the photosensors and the actuator shown in FIG. 18($a$).

FIG. 19 is a chart showing waveforms of output signals from the respective photosensors, which photosensors are included by the linear encoder shown in FIG. 17.

FIG. 20($a$) is a schematic view of an optical rotary encoder, showing a case where the platen cover is fully opened.

FIG. 20($b$) is a view of the optical rotary encoder, showing a case where an angle formed between the platen glass and the platen cover is γ°.

FIG. 20($c$) is a view of the optical rotary encoder, showing a case where the platen cover is completely closed.

FIG. 29($b$) is a chart showing waveforms of output signals from respective photosensors of the linear encoder, the linear encoder including an actuators in which slits, each having a same width with one another, are formed.

DESCRIPTION OF THE EMBODIMENTS

First Embodiment

Figure 1:
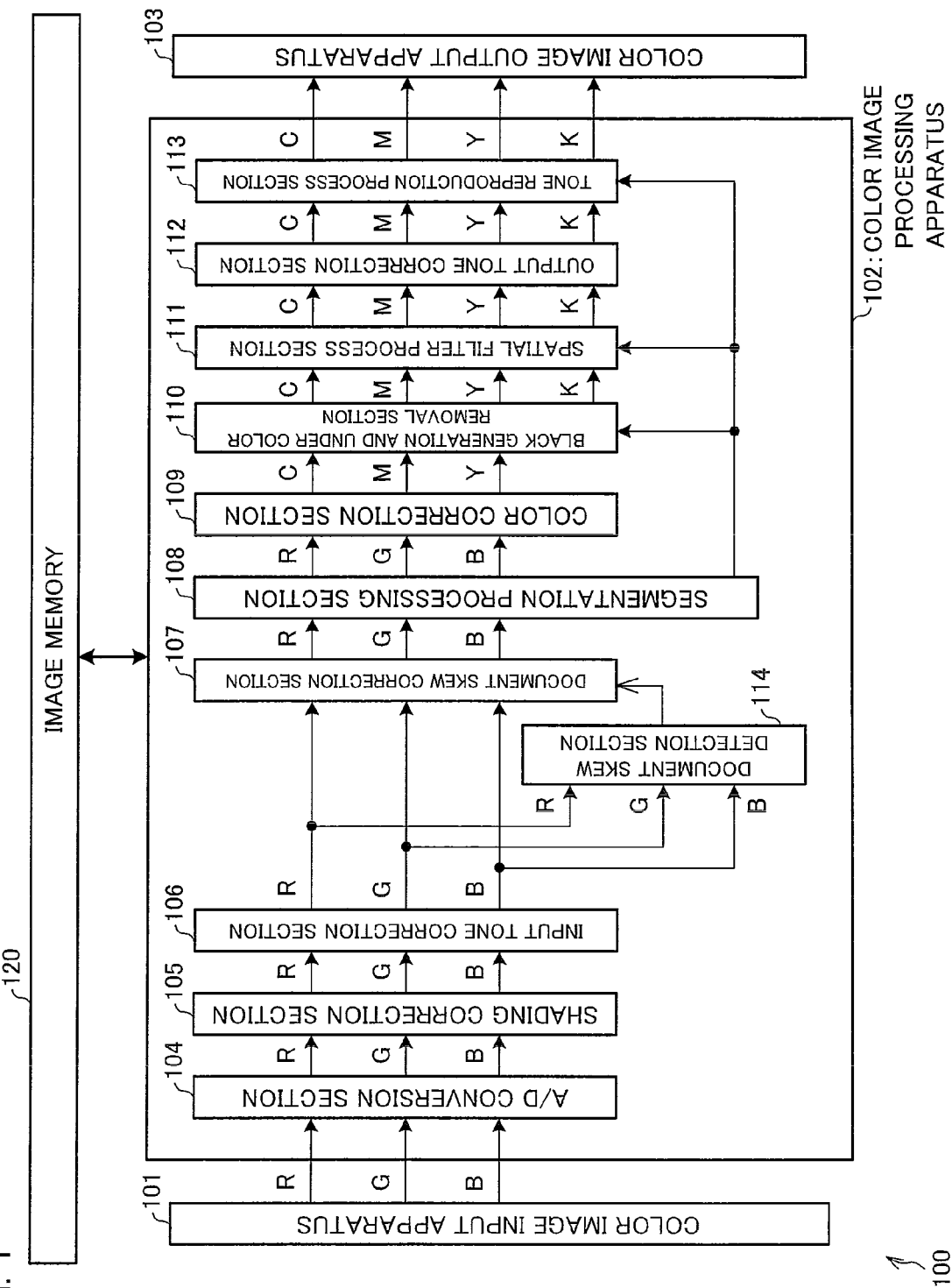
FIG. 1 is a block diagram schematically showing a configuration of a copying machine in accordance with First Embodiment of the present invention.

A copying machine, which is one embodiment of an image reading apparatus and an image forming apparatus of the present invention, is described with reference to the drawings. FIG. 1 is a block diagram schematically showing an arrangement of the copying machine in accordance with a present embodiment. As shown in FIG. 1, a copying machine (digital color copying machine) 100 includes an image input apparatus (color image input apparatus) 101, an image processing apparatus (color image processing apparatus) 102, and an image output apparatus (color image output apparatus) 103.

The image input apparatus (reading section) 101 is constituted by a reading section which includes a device, e.g., a CCD (photoelectric conversion device) line sensor or the like, for converting optical information into an electrical signal. As such, the image input apparatus 101 outputs a reflected optical image from a document by converting it into an analog RGB signal.

The analog RGB signal read out by the image input apparatus 101 is supplied to the image processing apparatus 102 in which the RGB signal is, in principle, sent from (i) an A/D conversion section 104, (ii) a shading correction section 105, (iii) an input tone correction section 106, (iv) a document skew correction section 107, (v) a segmentation process section 108, (vi) a color correction section 109, (vii) a black generation and under color removal section 110, (viii) a spatial filter process section 111, (ix) an output tone correction section 112, and (x) a tone reproduction process section 113 in this order. Then, the RGB signal is supplied to the image output apparatus 103 as a CMYK digital color signal. It is to be noted that a document skew detection section 114, which carries out a process with respect to data supplied from the input tone correction section 106, does not constitute a pipeline process.

The A/D conversion section 104 is a block which converts the analog RGB signal into a digital RGB signal. The shading correction section 105 is a block which carries out a process for eliminating distortion derived in an illumination system, an imaging focusing system, or an image sensing system of the image input apparatus 101, with respect to the digital RGB signal supplied from the A/D conversion section 104. Also, the shading correction section 105 is a block which concurrently carries out: adjusting of a color balance of the RGB signal; and converting of the RGB signal into a signal readily processable by the image processing apparatus 102. Examples of such signal include a density (pixel value) signal and the like.

The input tone correction section 106 is a block which (i) carries out an image quality adjustment process, such as removal of background density, contrast adjustment, or the like, with respect to the RGB signal from which the distortion is eliminated by the shading correction section 105, and then (ii) supplies the RGB signal after the image quality adjustment process, to the document skew correction section 107.

According to the present embodiment, in a case where a document skew correction mode is selected from optional functions (special functions) of a copy function (copy process) (see FIG. 14), first input image data and second input image data (RGB signal) are created by carrying out pre-scanning of the document, and correction target image data (RGB signal) are created by carrying out actual scanning of the document, the pre-scanning and the actual scanning being described later. In specific, by carrying out two pre-scanning and one actual scanning of the document, the first input image data, the second input data, and the correction target image data are created, respectively.

The correction target image data is then, as principle, sent from the input tone correction section 106 to the document skew correction section 107, whereas the first and the second input image data are, exceptionally, sent from the input tone correction section 106 to the document skew detection section 114 instead of the document skew correction section 107.

The document skew detection section 114 is a block which detects pixels corresponding to an edge of the document, and generates angular information, which is used by the document skew correction section 107 described later, in accordance with the RGB signals (the first and the second input image data) sent from the input tone correction section 106.

The document skew correction section 107 is a block which carries out, in a case where the document skew correction mode is selected, document skew correction (first rotation process) with respect to an image shown by the correction target image data (RGB signal), so that the image is rotated in accordance with the angular information generated in the document skew detection section 114. It is to be noted that in a case where the document skew correction mode is not selected, in contrast, the document skew correction section 107 carries out no process with respect to the RGB signal sent from the input tone correction section 106, and directly sends the RGB signal to the segmentation process section 108.

The segmentation process section 108 is a block which carries out a process for classifying each pixels constituting the input image into a text region, a halftone region, or a photograph region, in accordance with the RGB signal to which the image quality adjustment process has been carried out by the input tone correction section 106 (in a case where the document skew correction is being carried out, the segmentation process section 108 carries out the process in accordance with the RGB signal to which the document skew correction has been carried out by the document skew correction section 107). Further, the segmentation process section 108 outputs a segmentation class signal, in accordance with a segmentation result, to the black generation and under color removal section 110, the spatial filter process section 111, and the tone reproduction process section 113, the signal indicating into which region the pixel is classified. Concurrently, the segmentation process section 108 directly outputs the RGB signal to the color correction section 109 following the segmentation process section 108.

The color correction section 109 is a block which carries out color correction to the RGB signal from the segmentation process section so as to make color production accurate, such that color impurity is removed in accordance with spectral characteristics of a CMY color material containing an unnecessary absorption component. The black generation and under color removal section 110 is a block which carries out black generation, a process in which a black (K) signal is generated from a color-corrected CMY three-color signal, and subtracts the K signal from the original CMY signal so as to generate a new CMY signal. As such, the CMY three-color signal is converted into a CMYK four-color signal.

The spatial filter process section 111 is a block which carries out the spatial filter process by a digital filter, with respect to image data shown by the CMYK signal supplied from the black generation and under color removal section 110, such that a spatial frequency characteristic of the image data is corrected in accordance with the segmentation class signal. This makes it possible to reduce a blur or a graininess deterioration of an output image.

Like the spatial filter process section 111, the tone reproduction process section 113 is a block which carries out a given process to the image data shown by the CMYK signal, in accordance with the segmentation class signal, the given process being described below.

For example, for a region formed by pixels which are classified into the text region by the segmentation process section 108, the spatial filter process section 111 sharpens a high-frequency component, so as to improve a text reproducibility. Concurrently, the tone reproduction process section 113 carries out a binarization process or a multi-level dithering process by a high-resolution screen suitable for reproduction of a high-frequency component.

Furthermore, for a region formed by pixels which are classified into the halftone region by the segmentation process section 108, the spatial filter process section 111 carries out a low-pass filter process for removing an input halftone component. Then, the output tone correction section 112 carries out an output tone correction process for converting a signal, such as the density signal or the like, into a halftone dot area ratio which is a characteristic value used by the image output apparatus 103. After that, the tone reproduction process section 113 carries out the tone reproduction process for eventually segmenting the image into pixels and thereby allowing tone reproduction of the respective pixels.

Furthermore, for a region formed by pixels which classified into the photograph region by the segmentation process section 108, a binarization process or a multi-level dithering process by a screen suitable for tone reproduction is carried out.

The image data to which the respective processes have been carried out is (i) temporarily stored in a storage medium (which is not illustrated), and (ii) read out at given timing so as to be sent to the image output apparatus 103. The image output apparatus 103 forms (prints) an image on a recording medium, such a paper sheet or the like, in accordance with the image data. Though a printer adopting an electrophotographic printing method or an inkjet printing system can be raised as an example of the image output apparatus 103, the image output apparatus 103 is not particularly limited to this. It is to be noted that the processes by the respective blocks are controlled by a CPU (Central Processing Unit), which is not illustrated. In the present embodiment, the image processing apparatus 102 is explained as a component of the copying machine 100, yet the image processing apparatus 102 can be alternatively provided in a multifunction printer (image forming apparatus) which includes a copier function, a printer function, a facsimile transmission function, a "scan to e-mail" function, or the like.

Figure 2:
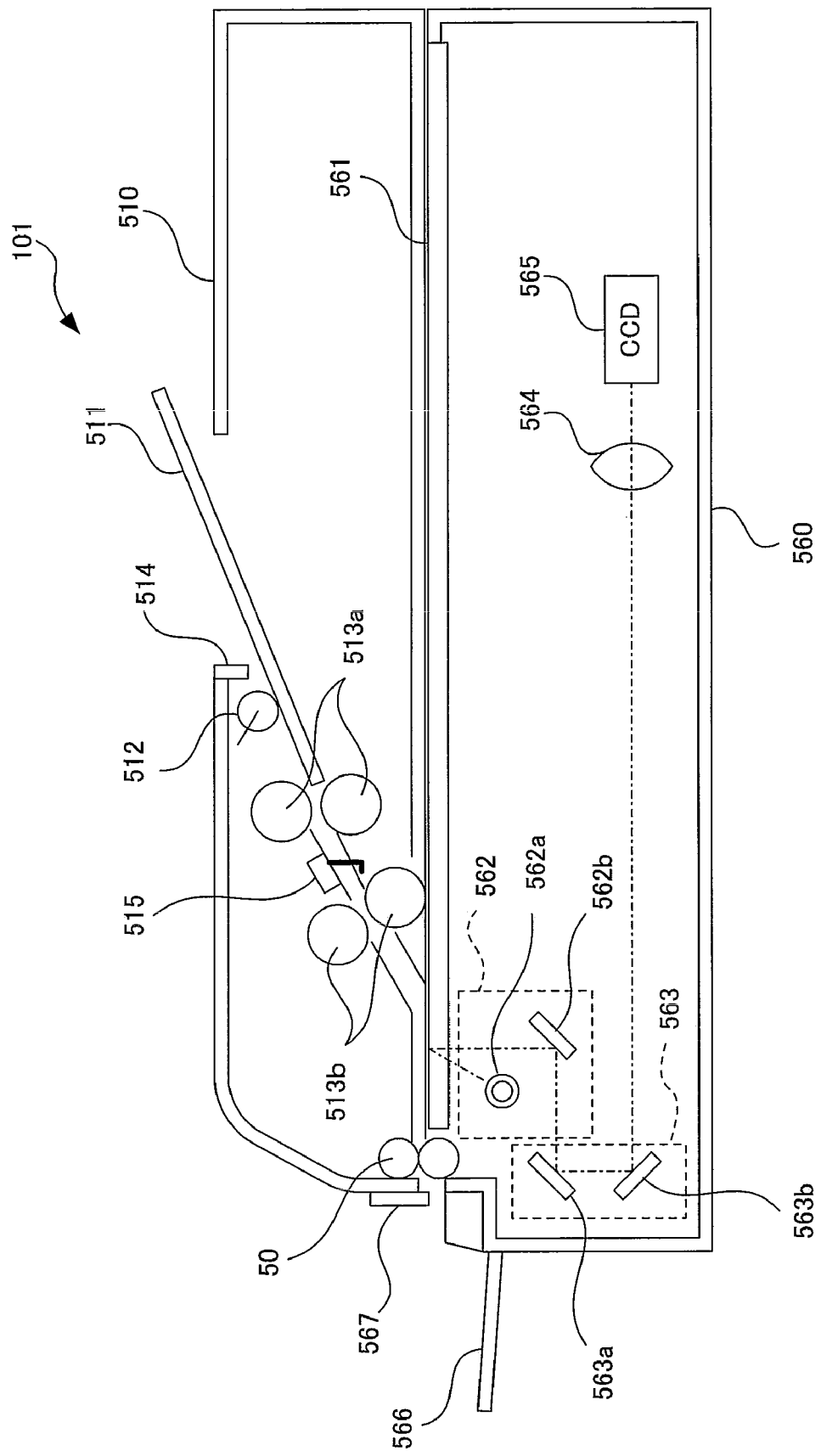
FIG. 2 is a view schematically showing an internal configuration of an image input apparatus included by the copying machine in FIG. 1.

Next, operation of the image input apparatus 101 is described in detail with reference to FIG. 2. FIG. 2 is a view schematically showing an internal arrangement of the image input apparatus 101.

As shown in FIG. 2, the image input apparatus 101 includes a document feeding section, which includes an upper housing 510, and a reading section (scanner section), which includes a lower housing 560, and the like. Provided in the upper housing 510 are (i) a document set sensor 514 for detecting a document which is placed on a document tray 511, (ii) a pick-up roller 512 for conveying documents piece by piece, (iii) conveyance rollers 513a and 513b for conveying a document in order that an image on the document is read out, (iv) a document delivery roller 50 for delivering the document, (v) a paper output tray 566 on which the delivered document is placed, (vi) a document delivery sensor 567 for detecting the delivered document, and (vii) the like member.

The conveyance roller 513b functions as an alignment roller for adjusting orientation of a paper sheet. The conveyance roller 513b has a drive shaft which is provided with an electromagnetic clutch (which is not illustrated). Transmission of a driving force from a drive motor (which is not illustrated) to the conveyance roller 513b is controlled by a control circuit (which is not illustrated) for controlling the electromagnetic clutch.

The conveyance roller 513b is not in operation unless there is the document. Once (i) a front end of the document is in contact with a feed timing sensor 515, and (ii) the control circuit receives a given signal from the feed timing sensor 515, the conveyance roller 513b starts rotating so that the document is transported in a direction from the document tray 511 to the paper output tray 566. It is set that the conveyance roller 513b starts rotating when the front end of the document, which is being transported downstream, (i) hits against a nip area of the conveyance roller 513b not being in operation, and (ii) is bent. This causes the front end of the document to be adjusted to be perpendicular with respect to the conveyance direction by the nip area of the conveyance rollers 513b.

Members provided in the lower housing 560 include; scanning units 562 and 563 which reciprocate along a lower surface of a scanner platen (table, scanner platen) 561; an image focusing lens 564; a CCD line sensor 565, which is a photoelectric conversion device; the paper output tray 566; and the like.

The scanning unit 562 includes: a light source 562a (e.g., a halogen lamp) for irradiating the document transported from the document tray 511 or the document placed on the platen glass 561 with light; a mirror 562b for directing a light reflect by the document in a given light path; and the like member. Also, the scanning unit 563 includes mirrors 563a and 563b for directing, on the CCD line sensor 565, the light which is reflected by the document and then directed by the mirror 562b.

The image focusing lens 564 directs the light from the scanning units 563 on a given part of the CCD line sensor 565 and forms an optical image. The CCD line sensor 565 carries out the photoelectric conversion with respect to the formed optical image, and outputs an electrical signal. That is, the CCD line sensor 565 outputs data, being separated into colors R (red), G (green), and B (blue), to the image processing apparatus 102 in accordance with a color image read out from the document (e.g., a surface of the document).

Figure 14:
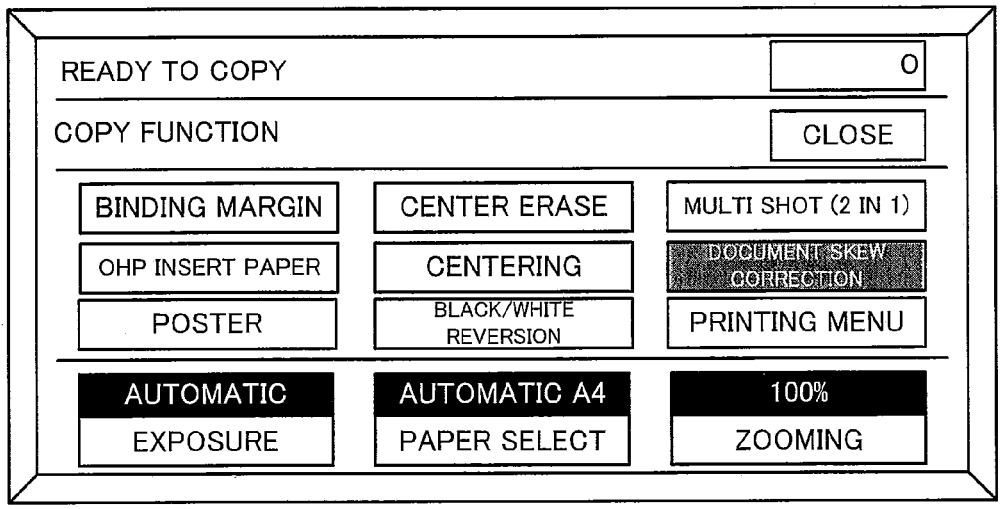
FIG. 14 is a view of a window in which the user selects from a menu of special functions.

Furthermore, in the present embodiment, in a case where the document skew correction mode (see FIG. 14) is selected, pre-scanning of the document is carried out before copy execution order is inputted (i.e., before a copy button is pressed). The following description explains the pre-scanning in detail. When the user closes the platen cover (platen mat) while the document skew correction mode is selected as shown in FIG. 14, the image input apparatus 101 carries out pre-scanning of the document on the platen glass 561 for two times and thereby to create first input image data and second input image data. Then, the image input apparatus 101 sends both the first and the second input data to the image processing apparatus 102. In the present embodiment, the upper housing 510 in FIG. 2 corresponds to the platen cover.

The following explains the pre-scanning in more detail. After the user starts closing the platen cover, an angle formed between the platen glass 561 and the platen cover becomes $\gamma°$ ($\gamma>0$), as shown in FIG. 9(a), and this triggers a start of first pre-scanning of the document on the platen glass 561. This causes the image input apparatus 101 to creates the first input image data.

In the present embodiment, it is to be assumed that when the angle formed between the platen glass 561 and the platen cover is $\gamma°$, as shown in FIG. 9(a), the document is skewed with respect to a vertical direction (reference direction) or a horizontal direction (reference direction) of the platen glass 561 by an angle $\theta_1°$, as shown in FIG. 9(b). As such, the first input image data shows an image in which a document image is skewed with respect to a vertical or a horizontal direction of the image by the angle $\theta_1°$.

After completion of the first pre-scanning, the image input apparatus 101 is caused to start second pre-scanning of the document on the platen glass 561 when the platen cover is completely closed as shown in FIG. 10(a) (when the angle formed between the platen glass 561 and the platen cover becomes 0°). This causes image input apparatus 101 to create the second input image data.

In the present embodiment, it is to be assumed that when the platen cover is completely closed as shown in FIG. 10(a), the document is skewed with respect to the vertical or the horizontal direction of the platen glass 561 by an angle $\theta_2°$ ($\theta_2°>\theta_1°$), as shown in FIG. 10(b). As such, the second input image data shows an image in which a document image is skewed with respect to a vertical or a horizontal direction of the image by the angle $\theta_2°$.

Figure 9:
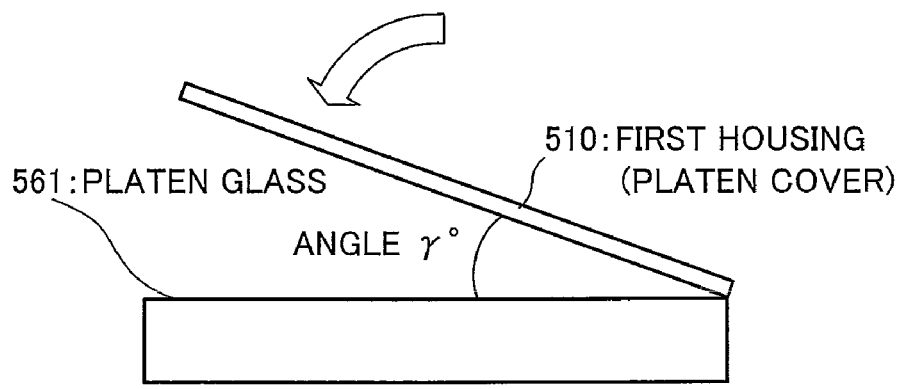
FIG. 9($a$) is a schematic side view of the image input apparatus, showing a case where an angle formed between a platen glass and a platen cover is γ°
Figure 9:
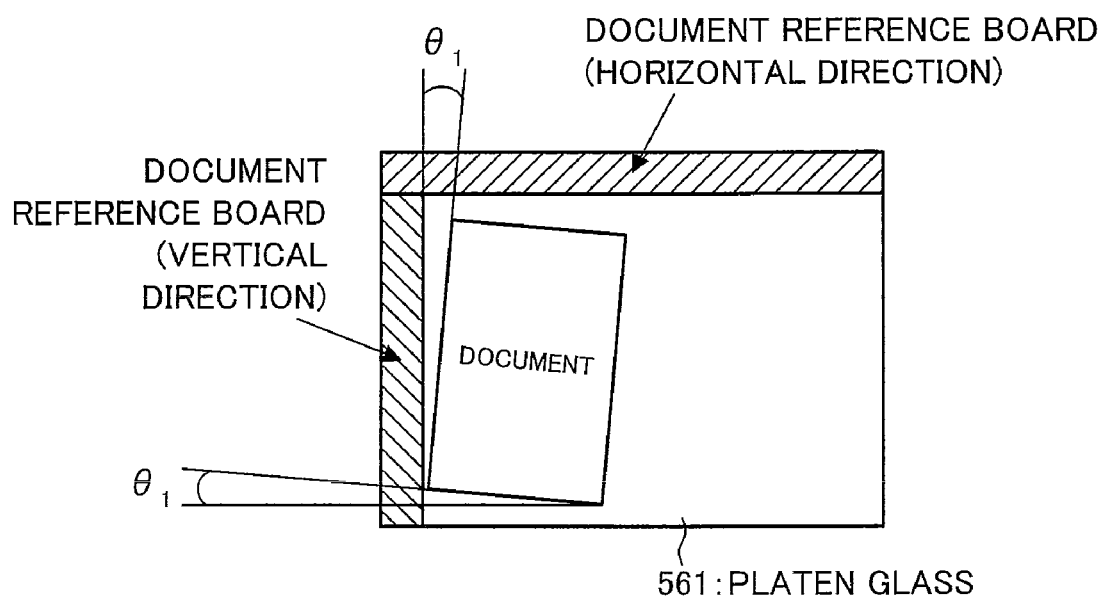
Figure 10:
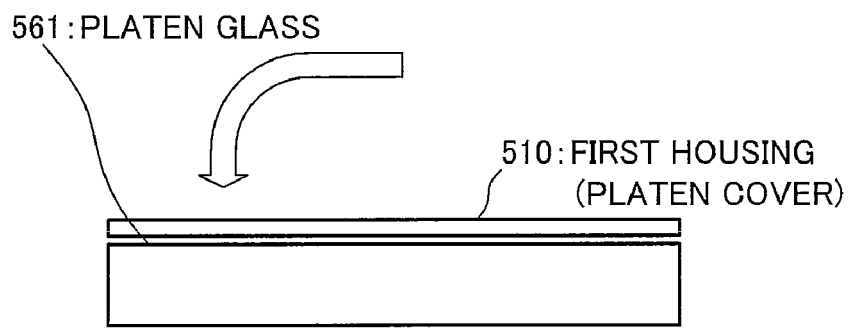
FIG. 10($a$) is a schematic side view of the image input apparatus, showing a case where the platen glass is covered by the platen cover.
Figure 10:
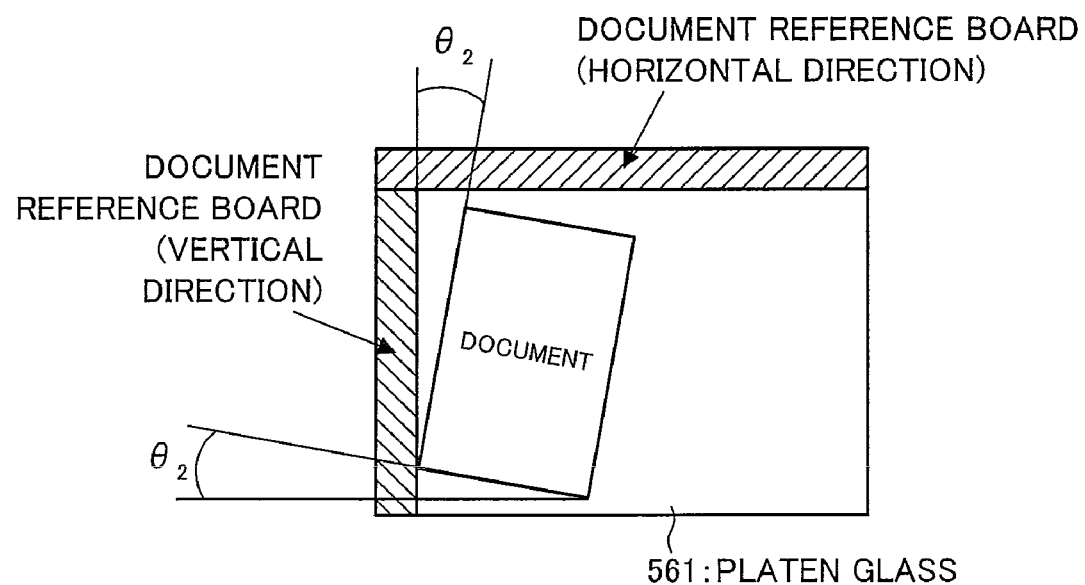

It is to be noted that a reason why a document skew angle $\theta_2°$ is greater than a document skew angle $\theta_1°$, as shown in each of FIGS. 9 and 10, is attributed to moving of the document by a wind pressure or shaking caused as the platen cover is closed, where the document skew angle $\theta_2°$ is obtained when the platen cover is completely closed and the document skew angle $\theta_1°$ is obtained when the angle formed by the platen glass 561 and the platen cover is $\gamma°$.

Subsequently, the image input apparatus 101 sequentially sends, to the image processing apparatus 102, the first and the second input image data which have been created. The first and the second input data sent to the image processing apparatus 102 are supplied to the document skew detection section 114 via the A/D conversion section 104, the shading correction section 105, and the input tone correction section 106.

Figure 3:
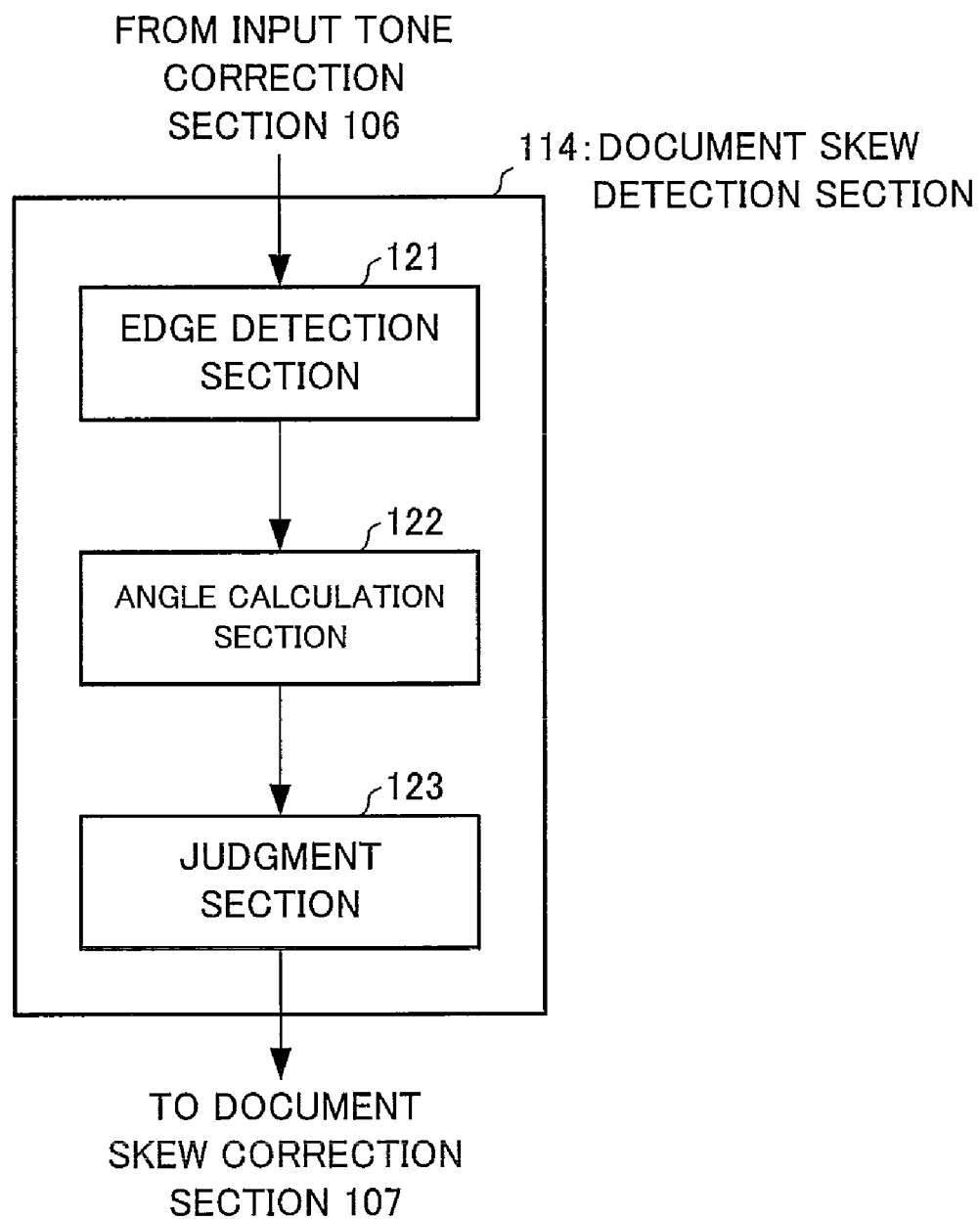
FIG. 3 is a block diagram schematically showing an arrangement of a document skew detection section included by an image processing apparatus shown in FIG. 1.

Next, a process to be carried out by the document skew detection section 114 is explained in detail. FIG. 3 is a block diagram schematically showing an arrangement of the document skew detection section 114. As shown in FIG. 3, the document skew detection section 114 includes an edge detection section 121, an angular calculation section 122, and a judgment section 123.

It is to be noted that "input image data" in the following explanation indicates (i) the first input image data in a case where data being processed by the document skew detection section 114 is the first input image data, and (ii) the second input image data in a case where the data being processed by the document skew detection section 114 is the second input image data. Further, an angle "θ°" shown in each of FIGS. 4 and 8 as well as in the following explanation indicates (i) the angle $\theta_1°$ shown in FIG. 9(a) in a case where the "input image data" below indicates the "first input image data", and (ii) an angle "$\theta_2°$" shown in FIG. 10(a) in a case where the "input image data" below indicates the "second input image data".

Figure 4:
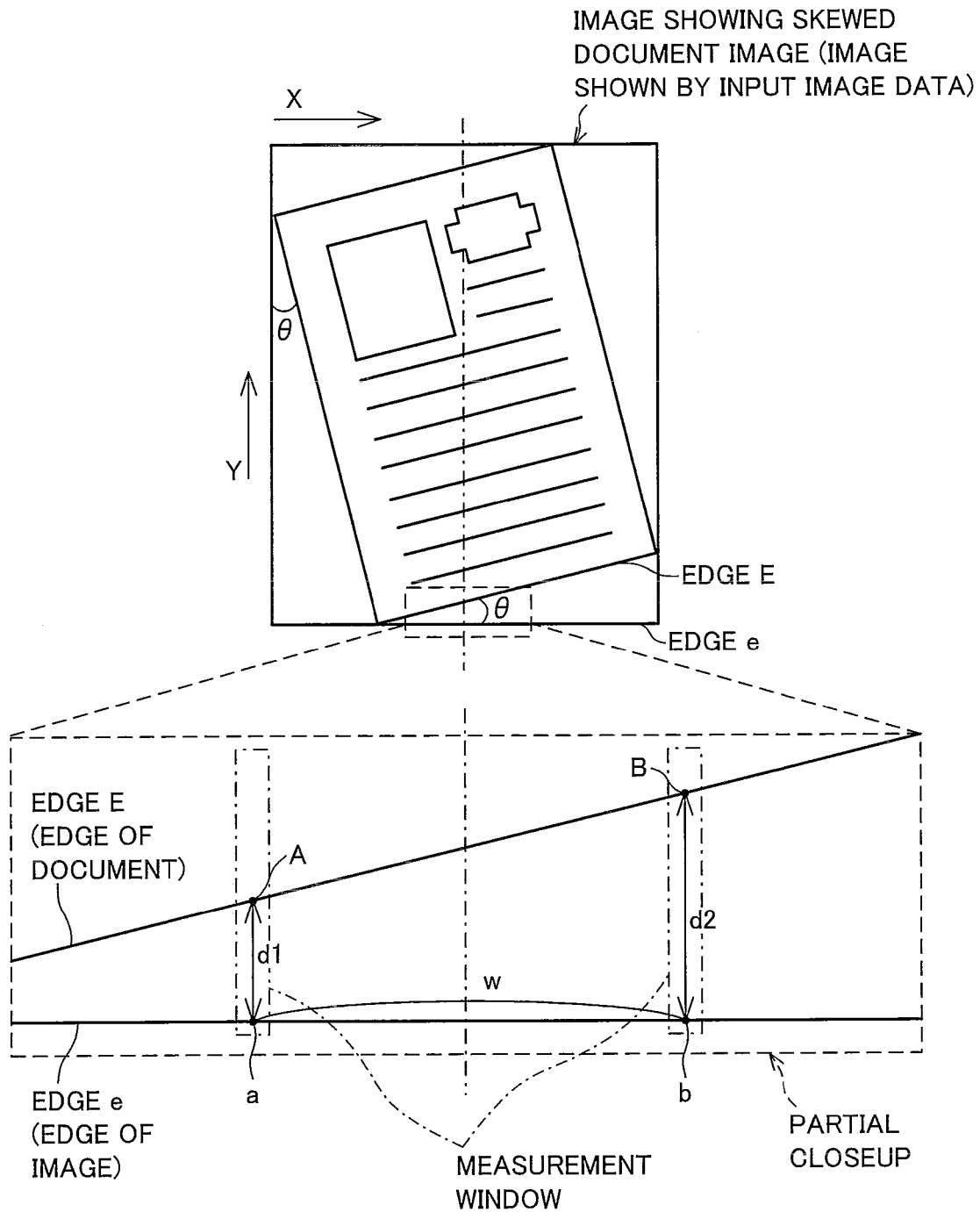
FIG. 4 is a view for explaining contents of a process, which process is carried out by the document skew detection section shown in FIG. 3.

The edge detection section 121 is a block which detects: two ones of pixels corresponding to an edge of the image shown by the input image data; and two ones of pixels corresponding to an edge of the document (document image) in the image, in accordance with the input image data supplied from the input tone correction section 106. That is, as shown in FIG. 4, the edge detection section 121 detects pixels a and b from pixels corresponding to an edge e, one edge of the image shown by the input image data. Further, the edge detection section 121 detects pixels A and B from pixels corresponding to an edge E, one edge of the document image in the image shown by the input image data. Though a conventionally-known method can be used as a method for detecting two ones of pixels corresponding to the edge E of the document image, the present embodiment uses a method for projecting a pixel value (or luminance value) obtained in measurement windows. The method for projecting the pixel value by use of the measurement windows is described below.

First, in the present embodiment, the vertical direction of the image shown by the input image data (the vertical direction of the platen glass 561, a direction perpendicular with respect to the edge e) is a Y coordinate axis, and the horizontal direction of the image shown by the input image data (the horizontal direction of the platen glass 561, the direction parallel with respect to the edge e) is an X coordinate axis. As shown in FIG. 4, the edge detection section 121 detects, as pixels a and b, two ones of pixels, each of two ones of pixels being apart from a center of the edge e in a direction of the X coordinate axis only by a distance W/2.

Furthermore, as shown in FIG. 4, the edge detection section 121 sets rectangular measurement windows for two region in the image shown by the input image data, the measurement windows having a longitudinal direction in a direction of the Y coordinate axis and a transverse direction in the direction of the X coordinate axis. The measurement windows are set for the respective regions in such a manner that the pixel a is included in one of the measurement windows, and the pixel b is included in the other one of the measurement windows. Further, as shown in FIG. 5, a size of the measurement windows is set in such a manner that the number of pixels in the Y coordinate direction is 150, and the number of pixels in the X coordinate direction is 20.

Figures 5, 6:
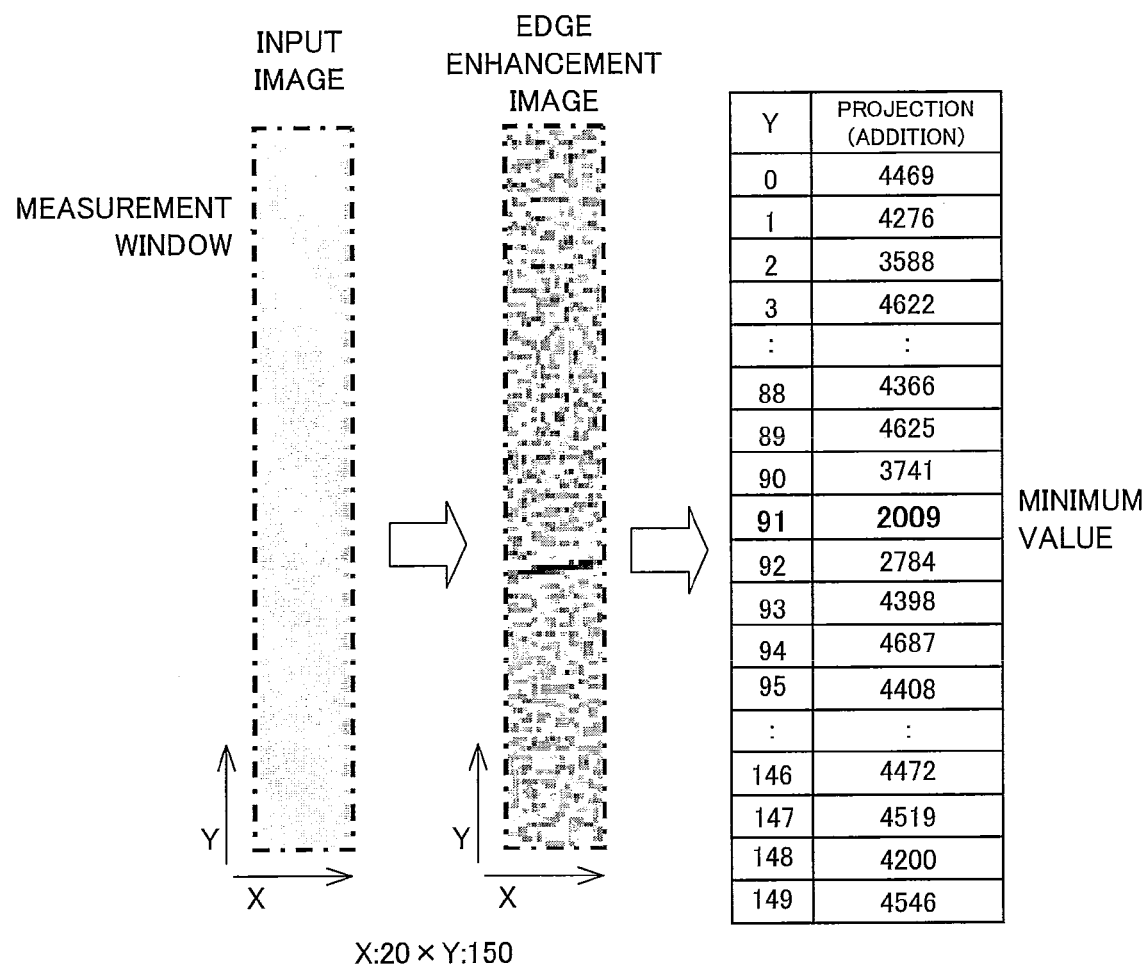
FIG. 5 is a view for explaining contents of a process, which process is carried out by an edge detection section shown in FIG. 3.
FIG. 6 is a view showing an example of an edge enhancement filter.
Figures 7, 8:
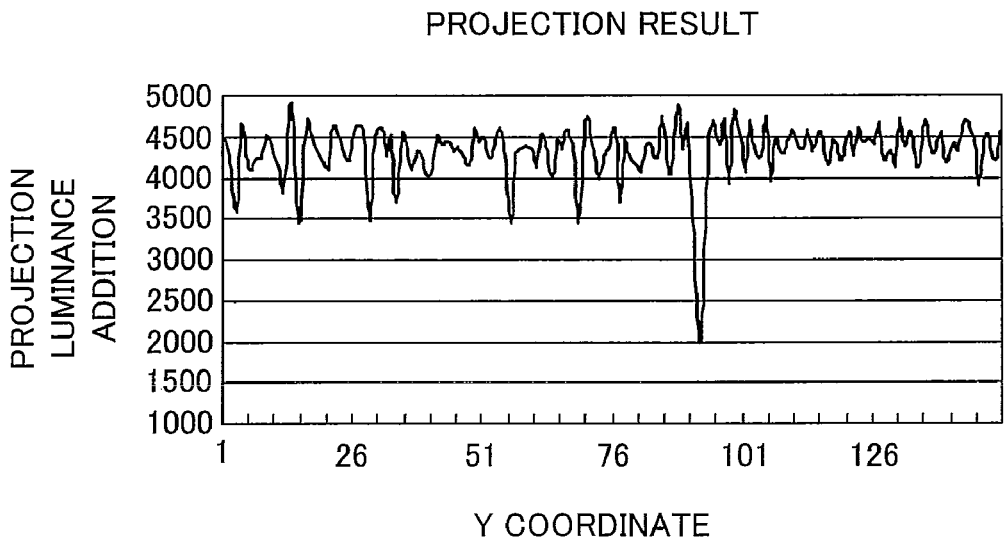
FIG. 7 is a graph showing an example of a result from a projection process, which projection process is carried out by the edge detection section shown in FIG. 3.
FIG. 8 is a table in which values for tan θ and values for θ are associated with each other, respectively.

Then, as shown in FIG. 5, the edge detection section 121 carries out an edge enhancement process with respect to an image in each measurement window, by use of an edge enhancement filter shown in FIG. 6. Further, the edge detection section 121 carries out, for respective lines orthogonal to the Y coordinate axis of the image shown in each measurement window processed with the edge enhancement process, a process (projection process) for calculating a sum of pixel values of all pixels on a line orthogonal to the Y coordinate axis, and then detects a peak value (e.g., minimum value) from calculated sum values (see FIG. 5). For example, in FIG. 5, the edge detection section 121 carries out, for respective lines whose Y coordinate values are in a range from 0 through 149, the process (projection process) for calculating a sum of pixel values, and then detects, as the peak value, the sum (2009) of the pixel values on the line whose Y coordinate value is 91. FIG. 7 is a graph showing a result of the projection process shown in FIG. 5.

Subsequently, the edge detection section 121 detects, from pixels on the line where the sum of the pixel values is detected to be the peak value, a pixel having a same X coordinate value as the pixel a in FIG. 4 as a pixel A on the edge E of the document. Further, the edge detection section 121 detects, from the pixels on the line where the sum of the pixel values is figured out to be the peak value, a pixel having a same X coordinate value as the pixel b in FIG. 4 as a pixel B on the edge E of the document. The edge detection section 121 thereby detects the pixels a and b and the pixels A and B shown in FIG. 4.

Above use of the method for projecting the pixel values obtained in the measurement windows has a merit in that noise influence can be prevented.

Next, the angular calculation section 122 (first angular specifying section and second angular specifying section) is described. The angular calculation section 122 is a block which calculates a skew angle θ° of the edge E of the image shown in FIG. 4, in accordance with the pixels A, B, a, and b each being detected by the edge detection section 121. As shown in FIG. 4; the skew angle θ° to be calculated is: an angle formed between the horizontal direction of the image shown by the input image data (i.e., the horizontal direction of the platen glass 561, the reference direction) and corresponding one of edges of the document; and an angle formed between the vertical direction of the image shown by the input image data (i.e., the vertical direction of the platen glass 561, the reference direction) and corresponding one of edges of the document.

The following explains, in detail, a step in which the angular calculation section 122 calculates the angle θ°. First, as shown in FIG. 4, the angular calculation section 122 calculates a distance d1 between the pixel A and a, and a distance d2 between the pixels B and b. The distance d1 is shown by: an absolute value of a difference between a Y-coordinate value of the pixel A and that of the pixel a; or the number of pixels between the pixels A and a. The distance d2 is shown by: an absolute value of a difference between a Y-coordinate value of the pixel B and that of the pixel b; or the number of pixels between the pixels B and b.

The angular calculation section 122 then calculates tan θ (tangent) for the skew angle θ of the edge E of the document image by putting respective values in places of d1, d2, and W in the following equation. As shown in FIG. 4, W is a distance between the pixels a and b, and is shown by (i) an absolute value of a difference between an X-coordinate value of the pixel a and that of the pixel b or (ii) the number of pixels between the pixels a and b.

$$\tan \theta = (d2-d1)/W \qquad \text{equation 1}$$

Furthermore, the angular calculation section 122 (i) refers to a table (FIG. 8) in which values for tan θ and values for θ are associated with each other, respectively, (ii) reads out a value of θ, which value is associated with a value of tan θ obtained in the equation 1, and (iii) specifies the read value of θ as a skew angle of the edge E of the document.

That is, the edge detection section 121 and the angular calculation section 122 can specify the angle $\theta_1$ shown in FIG. 9(b) by processing the first input image data in the way described above, and specify the angle $\theta_2$ shown in FIG. 10(b) by processing the second input image data in the way described above.

As shown in FIG. 9, the angle $\theta_1$ (first angle) identified by the angular calculation section 122 shows the angle which is formed between the vertical direction (or horizontal direction) of the platen glass 561 and corresponding one of the edges of the document before the platen cover is completely closed. Further, as shown in FIG. 10, the angle $\theta_2$ (second angle) specified by the angular calculation section 122 shows the angle which is formed between the vertical direction (or horizontal direction) of the platen glass 561 and corresponding one of the edges of the document after the platen cover is completely closed.

Next, the content of a process to be carried out by the judgment section 123 (angular information generation section, first judgment section) is explained in detail. The judgment section 123 carries out a process for judging whether the document skew correction is necessary or not in accordance with the angles $\theta_1$ and $\theta_2$ calculated by the angular calculation section 122, In specific, the Judgment section 123 generates angular information indicative of the following angular difference α, by putting the angles $\theta_1$ and $\theta_2$.

$$\text{angular difference } \alpha = |\theta_1 - \theta_2| \qquad \text{equation 2}$$

In a case where the angular difference α≧a threshold value TH, the judgment section 123 then judges the document skew correction to be necessary. In a case where the angular difference α<the threshold value TH, in contrast, the judgment section 123 then judges the document skew correction to be unnecessary. When judging the document skew correction to be necessary, the judgment section 123 sends (i) the angular information indicative of the angular difference α and (ii) a correction command to the document skew correction section 107. On the other hand, when judging the document skew correction to be unnecessary, the judging section 123 sends a correction unnecessity command to the document skew correction section 107.

Usable examples of the threshold value TH (first threshold value) for skew judgment includes a mean, a mode, a median, and the like values of the angular difference α which has been calculated so far in a case where the document skew correction mode is selected. Further, the threshold value TH for the skew judgment can be a fixed value. In a case where the angular difference α in a portrait A4 document is 1°, a head of the document is moved by approximately 5 mm.

Next, the document skew correction process to be carried out by the document skew correction section 107 is explained in detail. An affine transformation process (first and second rotation processes) by use of a rotation matrix can be used in the document skew correction process of the present embodiment. The affine transformation process is described below in detail.

A relation between a pixel (x, y) and a pixel (x', y'), which is obtained by rotating the pixel (x, y) by α°, is shown by the following equation 3.

$$\begin{pmatrix} x' \\ y' \end{pmatrix} = \begin{pmatrix} \cos\alpha & -\sin\alpha \\ \sin\alpha & \cos\alpha \end{pmatrix} \begin{pmatrix} x \\ y \end{pmatrix} \qquad \text{equation 3}$$

$$\begin{pmatrix} xs \\ ys \end{pmatrix} = \begin{pmatrix} \cos\alpha & \sin\alpha \\ -\sin\alpha & \cos\alpha \end{pmatrix} \begin{pmatrix} x' \\ y' \end{pmatrix} \qquad \text{equation 4}$$

$$Z_{(x',y')} = Z(xs, ys) \qquad \text{equation 5}$$
$$= (1-v)((1-u)Z_1 + uZ_2) + v((1-u)Z_3 + uZ_4)$$

Figure 11:
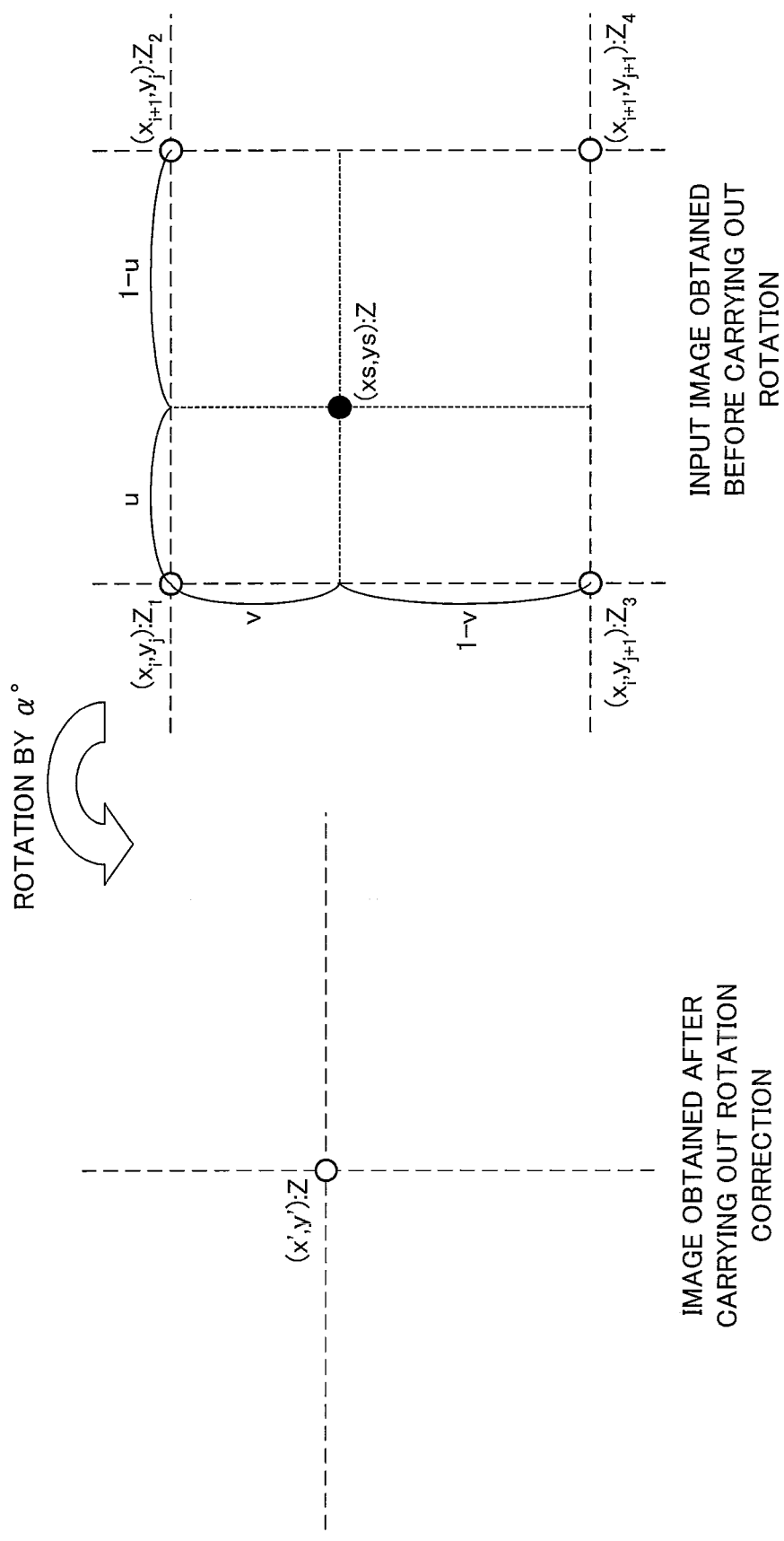
FIG. 11 is an explanation view showing an affine transformation.

As shown in FIG. 11, in order that a pixel value Z of the pixel (x', y') is outputted, a pixel value Z of a pixel (xs, ys) (xs and ys are actual numbers) is calculated by use of an interpolation operation such as a bilinear method or the like, where (i) coordinate values of the pixel (x', y') are integer numbers, and (ii) the pixel (x, y) obtained before rotation to the pixel (x', y') is carried out is defined as the pixel (xs, ys).

In specific, it is possible that the pixel (xs, ys), the pixel obtained before the rotation to the pixel (x', y') is carried out, be figured out by use of the equation 4 which is an inverse transform equation of the equation 3. Then, it is possible that the pixel value Z of the pixel (xs, ys), i.e., the pixel value Z of the pixel (x', y'), be figured out by putting, in the equation 5, pixels values $Z_1$ through $Z_4$ of respective pixels $(x_i, y_i)$, $(x_{i+1}, y_j)$, $(x_i, y_{j+1})$, and $(x_{i+1}, y_{j+1})$ provided in four points around the pixel (xs, ys) in the x-y coordinate system in the before-rotated image shown in FIG. 11.

For FIG. 11 and the equation 5, xi≦xs<xi+1 and yj≦ys<yj+1 are true. Further, for FIG. 11 and the equation 5, $|x_{i+1}-xs|:|x_s-x_i|=(1-u):u$ and $|y_{j+1}-y_s|:|ys-y_j|=(1-v):v$ are true (where both u and v are in a range greater or equal to 0 and less than 1).

When receiving the angular information and the correction command supplied from the judgment section 123 of the document skew detection section 114, the document skew correction section 107 carries out the document skew correction to correction target image data, (i) which has been read out by actual scanning described later and (ii) to which the image quality adjustment process have been carried out by the input tone correction section 106. In specific, the document skew correction section 107 carries out the affine transformation to the correction target image data, so that the document image shown by the correction target image data is rotated by the angular difference α indicated by the angular information sent from the document skew detection section 114. By storing values (sin values, cosine values) for a trigonometric ratio to be used in the affine transformation in a table, as shown in FIG. 8, it is possible to speed up calculation.

On the other hand, when receiving the correction unnecessity command sent from the judgment section 123 of the document skew detection section 114, the document skew correction section 107 carries out no document skew correction to the correction target image data, and directly sends the data to the segmentation process section 108.

Figure 12:
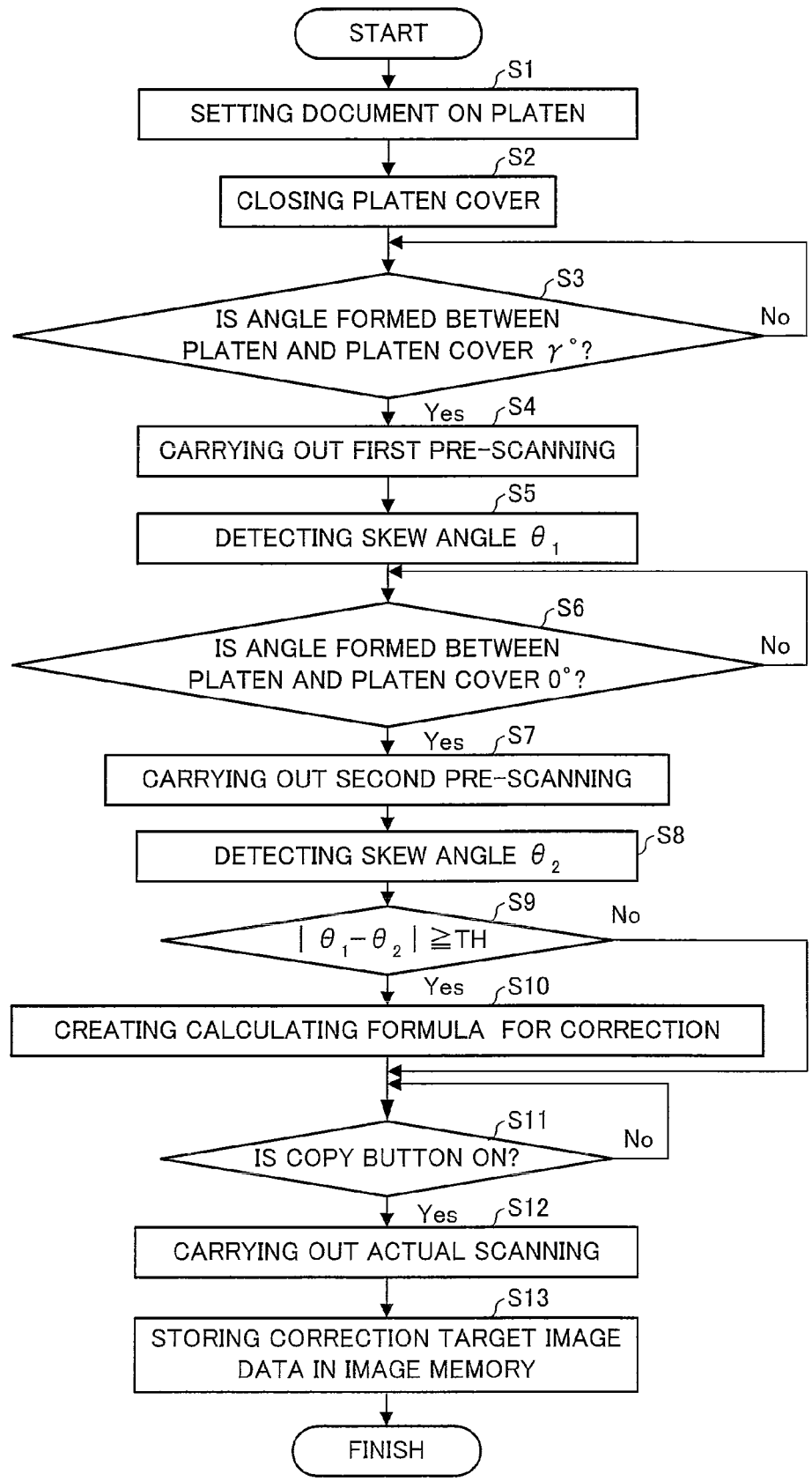
FIG. 12 is a flow chart showing an operating procedure of a user and a process flow in the copying machine.
Figure 13:
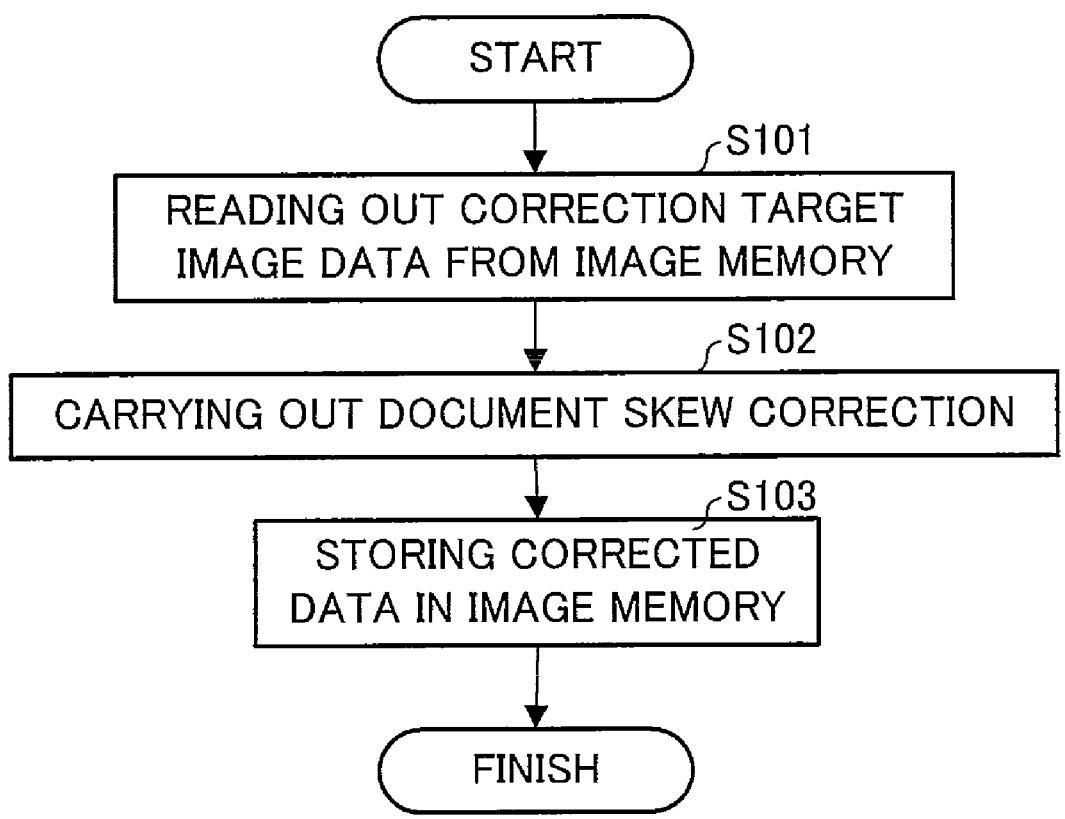
FIG. 13 is a flow chart showing a process flow in a document skew correction section.

Next, the following explains an operating procedure of the user and a process flow in the copying machine 100 each occurred in a case where the document skew correction mode is selected. FIG. 12 is a flow chart showing the operating procedure of the user and the process flow in the copying machine 100, each occurred in the case where the document skew correction mode is selected. Also, FIG. 13 is a flow chart showing a process flow in the document skew correction section 107.

As shown in FIG. 12, the user places a document on the platen glass 561 of the image input apparatus 101 (step S1), and starts closing the platen cover (step S2). When an angle formed between the platen cover and the platen glass 561 is detected to be γ° (e.g., 60°) (see FIG. 9(*a*)), the image input apparatus 101 carries out first pre-scanning of the document on the platen glass 561 (steps S3, S4). Subsequently, the document skew detection section 114 receives the first input image data obtained by carrying out the first pre-scanning, and calculates an angle θ$_1$ in FIG. 9(*b*) in accordance with the first input image data (step S5).

Furthermore, when the angle formed between the platen cover and the platen glass 561 is detected to be 0° (see FIG. 10(*a*)), the image input apparatus 101 carries out the second pre-scanning of the document on the platen glass 561 (steps S6, S7). Subsequently, the document skew detection section 114 receives the second input image data obtained by carrying out the second pre-scanning, and calculates out an angle θ2 in FIG. 10(*b*) in accordance with the second input image data (step S8).

After this, the document skew detection section 114 calculates out an angular difference α by putting θ$_1$, obtained in the step S5, and θ$_2$, obtained in the step S8, into the equation 2, and then compares the angular difference a with a threshold value TH (step S9). That is, because the angular difference α=|θ$_1$−θ$_2$|, |θ$_1$−θ$_2$| and the threshold value TH are compared with each other in the step S9.

Then, in a case where it is judged that the angular difference α≧the threshold value TH in the step S9, the document skew correction section 107 receives the angular information indicative of the angular difference α from the document skew detection section 114, and then forms the equations 3 and 4 in accordance with the angular difference α in advance, the equations 3 and 4 being calculating formulas to be required for carrying out the skew correction (step S10). Further, the document skew correction section 107 receives the correction command from the document skew detection section 114 in the case where it is judged that the angular difference α≧the threshold value TH in the step S9.

In contrast, in a case where it is judged that the angular difference α<the threshold value TH in the step 9, no process in the step S10 is carried out, and the process is advanced to the step S11. In the case where it is judged that the angular difference α<the threshold value TH in the step S9, the document skew correction section 107 receives the correction unnecessity command from the document skew detection section 114.

When the user presses down a copy button after completely closing the platen cover, a coping command is inputted, and the image input apparatus 101 carries out actual scanning of the document on the platen glass 561 so as to create the correction target image data (steps S11 and S12). The correction target image data is then stored in an image memory 120 after being subjected to the image quality adjustment process by the input tone correction section 106 (step S13).

Subsequently, as shown in FIG. 13, the document skew correction section 107 reads out the correction target image data stored in the image memory 120 (step S101). When having received the correction command from the document skew detection section 114, the document skew correction section 107 then carries out the skew correction with respect to the read-out correction target image data at the step S101, by use of S1, S2, and S3 created at the step S10 (step S102), and stores the correction target image data subjected to the skew correction into the image memory 120 (step S103).

In contrast, when having received the correction unnecessity command from the document skew detection section 114, the document skew correction section 107 carries out no process in the steps S101 through S103.

Subsequently, (i) the correction target image data, which is obtained after the coordinate transformation is carried out and which is processed with the skew correction, or (ii) the correction target image data not processed with the skew correction is read out from the image memory 120, is sent to the following segmentation process section 108, and sequentially processed with the pipeline process.

In the step S9 in FIG. 12, the process for judging whether the angular difference α≧the threshold value TH or not is carried out. Alternatively, a process for judging whether the angular difference α>the threshold value TH or not can be carried out in the step S9. Further, the angular difference α may not be compared with the threshold value TH, and the skew correction can be carried out by the degree of the angular difference α unless the angular difference α is 0 (i.e., it is judged whether the angular difference α≠0 or not in the step S9).

According to the present embodiment, furthermore, a scanning range for which the scanning units carry out scanning by moving several dozen mm (preferably, approximately 50 mm) from a reading start point is sufficient, regardless of a document size, for a scanning range for which the pre-scanning is carried out in a case where the document skew correction function is selected (a range of the images shown by the first and the second input image data) (i.e., a mere range in which pixels A, B, a, and b in FIG. 4 can be detected is sufficient). However, it is required that the document skew correction section 107 have information on the document size in order that an image range for which the document skew correction is carried out after the document skew detection section 114 carries out the processes is figured out. Examples of a method for having the information on the document size include: a method for figuring out a document size in a main scanning direction and that in a vertical scanning direction for a document placed on the platen, by use of a photoelectric conversion device, such as a phototransistor or the like, which is provided in the image input apparatus 101; a method for detecting, by the control section (which is not illustrated), document sizes selected by the user via an operation panel.

Furthermore, according to the present embodiment, the image input apparatus 101 is caused to start (i) the first pre-scanning when the angle formed between the platen glass 561 and the platen cover becomes γ°, and (ii) the second pre-scanning when the angle formed between the platen glass 561 and the platen cover becomes 0°. In view of this, it is necessary to provide, in the image input apparatus 101, the angle detection mechanism for detecting the angle formed between the platen glass 561 and the platen cover. A control apparatus (which is not illustrated) for controlling the image input apparatus 101 causes the image input apparatus 101 to carry out the pre-scanning when the angle detected by the angle detection mechanism becomes γ° or 0°.

An optical linear encoder (detection section) can be raised as an example of the angular detection mechanism. The linear encoder is explained below with reference to the drawings.

FIG. 17 is a view schematically showing an optical linear encoder 300 raised as an example of the angle detection mechanism. FIG. 17(*a*) is a view of the linear encoder 300, showing a case where the platen cover is fully opened. FIG. 17(*b*) is a view of the linear encoder 300, showing a case where the angle formed between the platen glass 561 and the platen cover is γ°. FIG. 17(*c*) is a view of the linear encoder 300, showing a case where the platen cover is completely closed. FIG. 18(*a*) is a top view showing photosensors 302 and 305 and an actuator 303 each being included by the linear encoder 300 in FIG. 17. FIG. 18(*b*) is an elevation view showing photosensors 301, 302, and 305 and the actuator 303. FIG. 18(c) is a side view of the photosensors 301, 302, and 305 and the actuator 303.

The linear encoder 300 shown in each of FIGS. 17 and 18 includes the actuator 303 in which a plurality of slits is formed. In a case where one of the slits is positioned between a light-emitting element and a light-receiving element of the photosensor 301 or the photosensor 302, a signal outputted from the photosensor 301 or the photosensor 302 is turned on. That is, the actuator 303 is moved in a vertical direction by opening and closing of the platen cover, thereby causing changes in waveforms of signals outputted from the two respective photosensors 301 and 302.

Furthermore, in a case where the platen cover is fully opened, the actuator 303 does not block a light path between the light-emitting element and the light-receiving element of the photosensor 305, thereby causing the signal outputted from the photosensor 305 to be turned on. In any other cases, the actuator 303 blocks the light path between the light-emitting element and the light-receiving element, thereby causing the signal outputted from the photosensor 305 to be turned off.

Also, as shown in FIG. 17, the linear encoder 300 includes a sensor hold stand 304 for holding the actuator 303. The sensor hold stand 304 has a hollow shape into which a spring or the like is inserted so as to allow a vertical movement of the actuator 303.

FIG. 19 shows how the waveforms of signals outputted from respective photosensors 301, 302, and 305, change as states of the platen cover and the linear encoder 300 are changed from: a state where the platen cover is fully opened; a state where the angle formed between the platen cover and the platen glass is γ°; to a state where the platen cover is completely closed, each state being shown in FIG. 17. It is arranged such that when a period shown by a reference 330 in FIG. 19 is detected, the angle formed between the platen glass 561 and the platen cover is detected to be γ°. It is to be noted that a value of γ° can be set freely, provided that a slit is positioned between the light-emitting element and the light-receiving element of the photosensor 301 or 302.

Furthermore, an optical rotary encoder (detection section) can be raised as another example of the angle detection mechanism. The rotary encoder is explained below with reference to the drawings.

Figure 21:
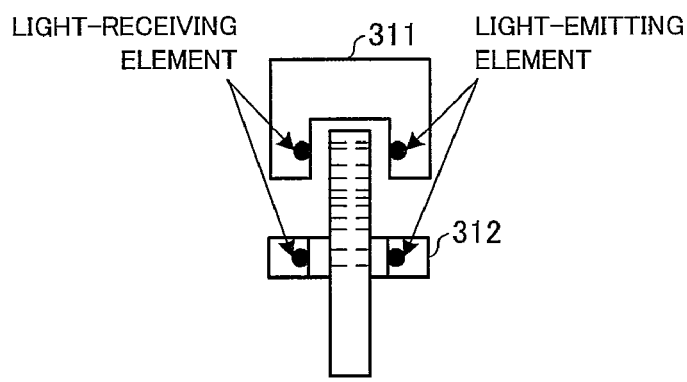
FIG. 21 is a projection view of the optical rotary encoder, showing the encoder from an arrowed direction shown in FIG. 20($c$).

FIG. 20 is a view schematically showing an optical rotary encoder 310. FIG. 20(a) is a view of the rotary encoder 310, showing a case where the platen cover is fully opened. FIG. 20(b) is a view of the rotary encoder 310, showing a case where the angle formed between the platen glass 561 and the platen cover is γ°. FIG. 20(c) is a view of the rotary encoder 310, showing a case where the platen cover is completely closed. FIG. 21 is a view showing the rotary encoder 310 from an arrowed direction shown in FIG. 20(c).

As shown in each of FIGS. 20 and 21, the rotary encoder 310 includes photosensors 311 and 312, and a circular disk 313. The circular disk 313 rotates in conjunction with the platen cover. In the circular disk 313, a plurality of slits is formed along a circumferential direction. As shown in FIG. 21, a slit formed in the circular disk 313 passes between a light-emitting element and a light-receiving element of the photosensor 311 as the circular disk 313 rotates. The slit formed in the circular disk 313 is positioned between a light-emitting element and a light-receiving element of the photosensor 312 only at timing when the platen cover is completely closed.

Figure 22:
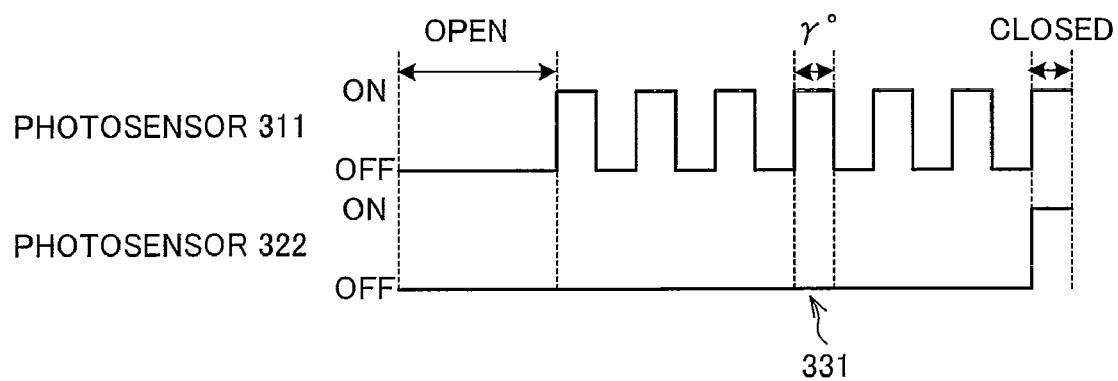
FIG. 22 is a chart showing waveforms of output signals from respective photosensors, which photosensors are included by the optical rotary encoder.
Figure 23:
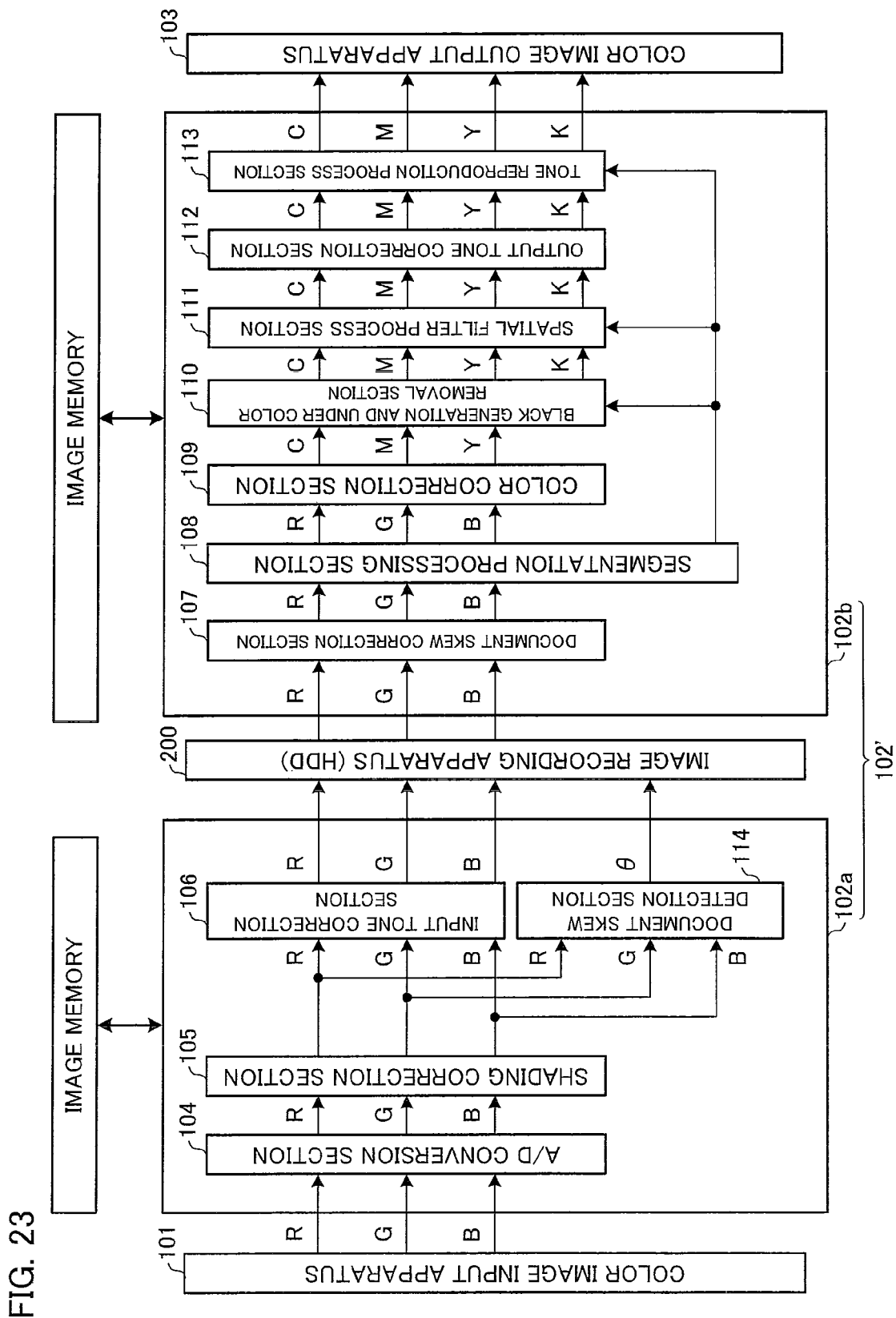
FIG. 23 is a block diagram showing a copying machine in accordance with Third Embodiment of the present invention.

FIG. 22 shows how the waveforms of signals outputted from respective photosensors 311 and 312 change as states of the platen cover and the rotary encoder 310 are changed from: the state; where the platen cover is fully opened; the state where the angle formed between the platen cover and the platen glass is γ°; to the state where the platen cover is completely closed, each state being shown in FIG. 20. It is arranged such that when an ON period of the photosensor 311 shown by a reference 331 in FIG. 22 is detected, the angle formed between the platen glass 561 and the platen cover is detected to be γ°. It is to be noted that a value of γ° can be set freely, provided that a slit is positioned between the light-emitting element and the light-receiving element of the photosensors 311.

Furthermore, the copying machine 100 of the present embodiment is arranged such that the document skew correction is carried out in a case where the document skew correction mode has been selected from the optional functions (special functions) of the copy mode (copy process). FIG. 14 shows a window in which the document skew correction selection mode is selected, and menus of the optional functions are shown.

Figure 15:
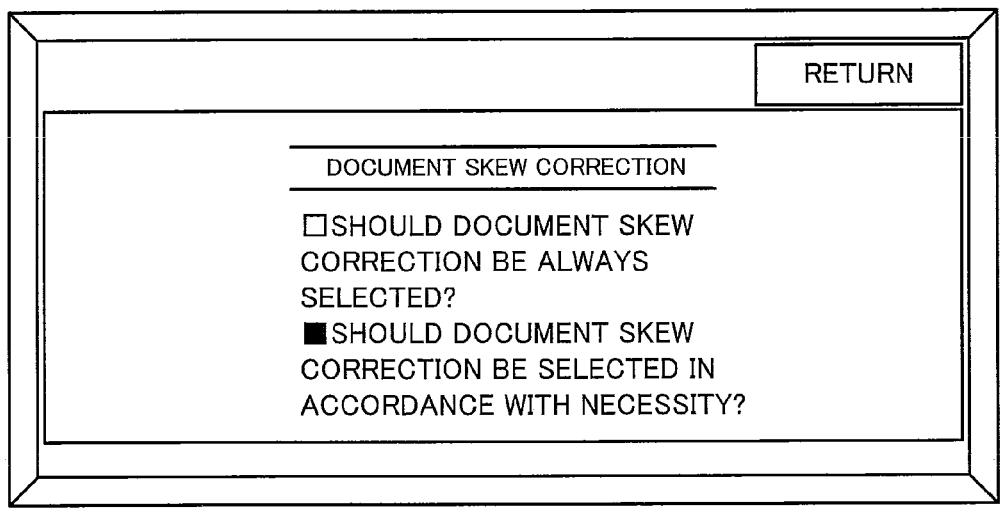
FIG. 15 is a view of a window in which the user selects between setting statuses of a document skew correction mode.

When the user selects, as shown in FIG. 14, the "document skew correction" from the menus of the copy function, a menu window for the document skew correction is displayed as shown in FIG. 15. The menu window shown in FIG. 15 is a window in which the user selects a setting condition of the document skew correction mode. In a case where the user selects a setting in which the document skew correction mode is always activated, the document skew detection section 114 operates whenever copying or filing (a process for reading out an image on the document and sending the image) is carried out, and if necessarily, the document skew correction is carried out.

Figure 16:
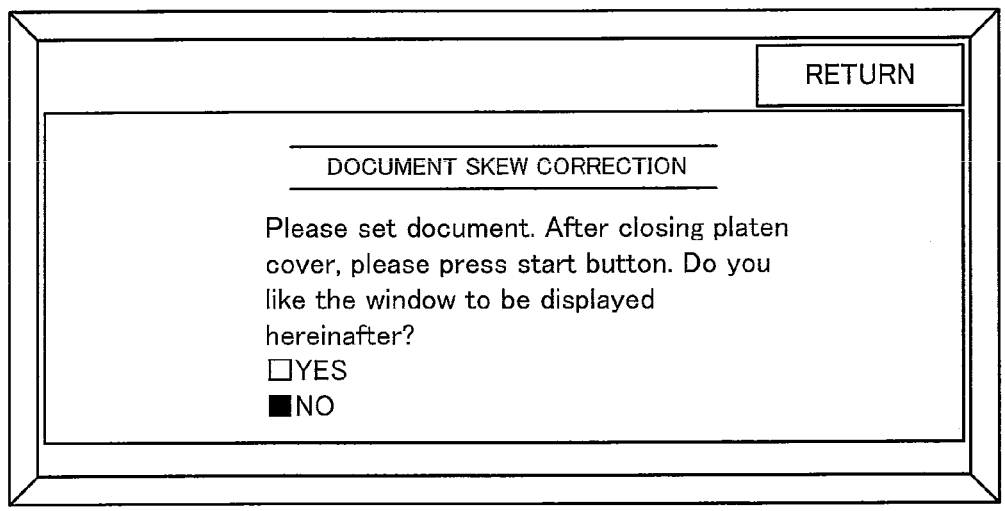
FIG. 16 is a view of a window in which the user selects whether a usage guide for the document skew correction should be displayed or not.

Furthermore, in the case where the user selects the setting in which the document skew correction mode is always activated, a menu window shown in FIG. 16 is displayed. The menu window shown in FIG. 16 is an image in which the user selects whether a display of a usage guide for the document skew correction is necessary or not. Further, even though it is not illustrated in the drawings, any of the following windows can be displayed: that is, a window in which a value of a threshold value TH is inputted; a window in which it is set that the document skew correction is carried out even when little skew is detected; a window in which a value of the angle γ°, formed between the platen cover and the platen glass when the first pre-scanning is carried out, is inputted; or the like windows.

Furthermore, in a case where the document is a thin paper, it is more likely that the document is moved as the platen cover is closed. In view of this, for example, the document skew correction mode can be automatically selected in a case where processing of the thin paper is carried out.

As described hereinabove, according to the present embodiment, the angle $\theta_1$ (first angle) formed between the reference direction (vertical or horizontal direction) and the edge of the document placed on the platen glass 561 is specified in accordance with the first input image data (first image data) obtained by reading the document, the document being started to be read when a positional relation between the platen glass 561 (platen 561) and the platen cover for covering the document on the platen glass 561 is in the first state, i.e., the angle formed between the platen glass 561 and the platen cover is γ°. Further, the angle $\theta_2$ (second angle) formed between the reference direction and the edge of the document is specified in accordance with the second input image data (second image data) obtained by reading out the document, the document being started to be read out when the positional relation between the platen glass 561 and the platen cover is in the second state, i.e., the angle formed between the platen glass 561 and the platen cover is 0°. Further, the angle difference $\alpha=|\theta_1-\theta_2|$ is outputted as the angular information.

According to such an arrangement, if the document on the platen glass 561 is not moved at all, the angular difference $\alpha$ will be 0 in either case where: the document is placed on the platen glass 561 in such a manner that the edge of the document is set along the reference direction; or the document is placed on the platen glass 561 in such a manner that the edge (of the document) is intentionally skewed with respect to the reference direction by the user. In contrast, if the document on the platen glass 561 is moved by a wind pressure, shaking, or the like caused as the platen cover is closed (if the document is skewed unintentionally to the user), the angular difference $\alpha$ will be a value other than 0 in either case where; the document is placed on the platen glass 561 in such a manner that the edge of the document is set along the reference direction; or the document is placed on the platen glass 561 in such a manner that the edge (of the document) is intentionally skewed with respect to the reference direction, by the user. As such, with the present embodiment, it is possible to detect the document which is skewed unintentionally to the user, and a degree of the skew in a case where the document is skewed unintentionally to the user, by referring to the angular information indicating the angular difference $\alpha$.

Furthermore, according to the present embodiment, the document skew correction section 107 receives the correction target image data obtained by reading out the document, the document being started to be read out after the platen cover is completely closed (after a positional relation between the platen glass 561 and the platen cover is in the second state). The document skew correction section 107 then carries out the rotation process with respect to the correction target image data in accordance with the angular information, such that the correction target image data is rotated by the angular difference $\alpha$ (first rotation process). As such, in the case where the document on the platen glass 561 is skewed by a wind pressure, shaking, or the like caused as the platen cover is closed, it is possible that the skew of the document image thereby caused be corrected.

Furthermore, it is possible that unnecessary skew correction be prevented from being carried out because the document skew intentionally caused by the user is not corrected by the rotation process to be carried out in the document skew correction section 107.

Furthermore, in a case where the document, which has been placed on the platen glass 561 by the user in such a manner that the edge of the document is intentionally skewed with respect to the reference direction, is further skewed by a wind pressure, shaking, or the like caused as the platen cover is closed, the document skew correction section 107 corrects only the skew which is caused as the platen cover is closed, and leaves the skew, which is intentionally caused by the user, being uncorrected. As such, even in the case where the document, which has been placed on the platen by the user in such a manner that the edge (of the document) is intentionally skewed with respect to the reference direction, is further skewed by a wind pressure, shaking, or the like caused as the platen cover is closed, it is made possible that the document of the skew, which is intentionally caused by the user, be accurately reflected in an image processed with correction.

Furthermore, the copying machine 100 of the present embodiment includes an angle detection mechanism (detection section) for detecting an angle formed between the platen glass 561 and the platen cover. When the angle detection mechanism detects an angle of $\gamma$° (first setup angle), the image input apparatus 101 starts the first pre-scanning so as to create the first input image data, and when the angle detection mechanism detects an angle of 0° (second setup angle), the image input apparatus 101 starts the second pre-scanning so as to create the second input image data. Because angle detection mechanism is an optical rotary encoder 310 or an optical rotary linear encoder 300, it is possible to accurately detect the angle formed by the platen glass 561 and the platen cover.

Furthermore, in the present embodiment, because the first and the second input image data obtained by carrying out two pre-scanning are data used for specifying the angle $\theta_1$ and the angle $\theta_2$, respectively, the first and the second input image data should be data showing the edge E of the document, yet do not have to be data showing the whole document. As such, it is preferable that the image input apparatus 101 read out, by carrying out the pre-scanning, a part of a whole region of the document, in which part the edge E of the document is included. This allows a reduction of time required for carrying out scanning, a reduction of time required for processing the first and the second input image data, saving of electrical power consumption, and a reduction of a process time.

Furthermore, the image input apparatus 101 includes scanning units 562 and 563, each of which moves back and forth along a vertical scanning direction. The scanning units 562 and 563 move in a forward direction (a given direction) in the first pre-scanning, and move in a backward direction (opposite direction of the given direction) in the second pre-scanning. As such, as the scanning units 562 and 563 move back and forth one time, the first pre-scanning and the second pre-scanning are carried out, thereby outputting the first and the second input image data.

Furthermore, in the present embodiment, in order that both the first and the second pre-scanning is carried out as the platen cover is closed, the first pre-scanning needs to be carried out at a high speed. In view of this, it is preferable that a travel speed of the scanning units 562 and 563 in the first pre-scanning be differed from that in the second pre-scanning. More specifically, it is preferable that the travel speed of the scanning units 562 and 563 in the first pre-scanning be speeded up, whereas that in the second pre-scanning be slowed down. This may slightly lower a resolution of the first input image data obtained by carrying out the first pre-scanning (i.e., the image slightly becomes rough), increases a resolution of the second input image data obtained by carrying out the second pre-scanning. As such, an accuracy of the angular information to be detected in accordance with the first and the second input image data is maintained.

Furthermore the copying machine 100 of the present embodiment is arranged so as to be able to switch a mode between a document skew correction mode (document skew correction function) and a non-correction mode, the document skew correction mode causing the document skew detection section 114 and the document skew correction section 107 to be operated, whereas the non-correction mode causing the document skew detection section 114 and the document skew correction section 107 not to be operated. As such, according to the arrangement, in a case where the document skew correction does not have to be carried out, the non-correction mode is set. This allows the pre-scanning or the like for creation of the first and the second input image data to be skipped, thereby making it possible to save electrical power consumption and to prevent wearing of the apparatuses. In a case where the document is a thin paper, it is more likely that the document is moved as the platen cover is closed. As such, for example, it is preferable that the copying machine 100 be arranged such that in a case where the document on the platen glass 561 is detected to be the thin paper, the document skew correction mode is selected. The copying machine 100 detects that the document on the platen glass 561 is the thin paper, in accordance with information inputted by the user (command for specifying a thin paper mode).

Furthermore, in a case where the user intentionally skews the document, it is to be assumed that the document is placed in such a manner that the skew is detectable. In view of this, when the skew angle (i.e., $\theta_1$) of the document in the image shown by the first input image data obtained by carrying out the first pre-scanning is remarkably small, it is more likely that the document is skewed due to a wind pressure, shaking or the like, than that the document is intentionally moved by the user. As such, the document skew detection section (second judgment section) 114 Judges whether or not the angle $\theta_1$ shown in FIG. 9(b) is less than or equal to the threshold value Th (second threshold value) in accordance with the first input image data. In a case where the angle $\theta_1$ is less than or equal to the threshold value Th, the document skew correction section 107 can carry out, without carrying out the rotation process (the first rotation process) in which the correction target image data is rotated by the angular difference α, the rotation process (second rotation process) with respect to the correction target image data so that the correction target image data is rotated by the angle θ1. This makes it possible, depending on a case, to correct the skew of the document before carrying out the second pre-scanning, thereby making it possible to realize a reduction of a process time.

Furthermore, a mechanism for notifying the user of a skew degree of the document can be additionally provided. For example, when the first and the second input image data are created, the document skewed by the angle $\theta_1$ and the document skewed by the angle $\theta_2$ can be displayed on a monitor (which is not illustrated). Further, in this case, by showing an overlapping region of the above documents and non-overlapping regions of the respective documents in different colors, it is possible to notify the user of the skew degrees of the documents in a readily understandable manner.

Second Embodiment

In the present embodiment, a configuration of an image processing apparatus 102 is same as in FIG. 1, whereas an operating procedure of the user and contents of a process in a copying machine 100 are different from a flow chart in FIG. 12. A process flow in accordance with Second Embodiment is explained below with reference to a flow chart in FIG. 25.

Figure 25:
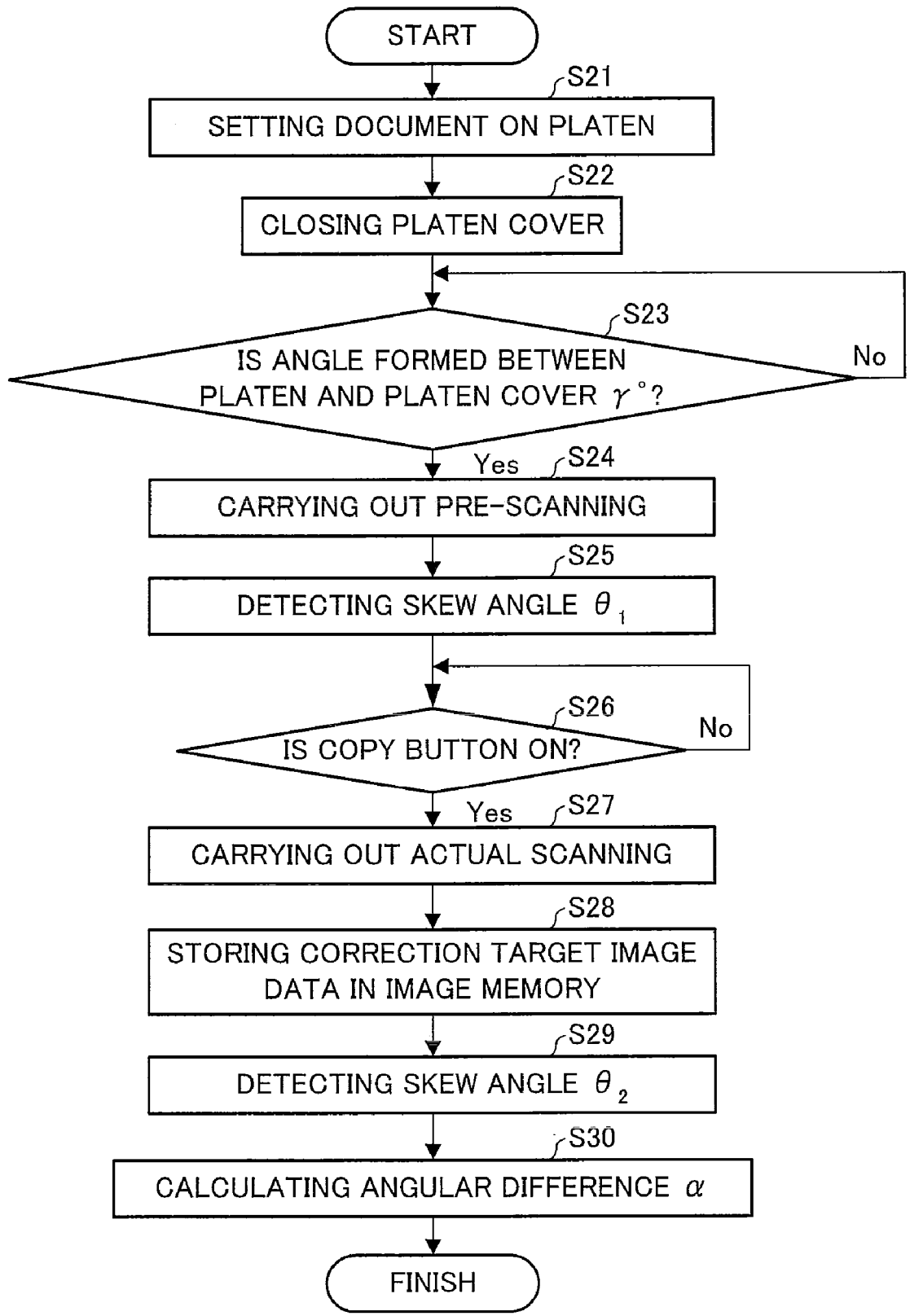
FIG. 25 is a flow chart showing an operating procedure of the user and a process flow in the copying machine in accordance with Second Embodiment of the present invention.

As shown in the flow chart in FIG. 25, the user sets a document on a platen glass 561 of an image input apparatus 101 (step S21), and starts closing a platen cover (step S22). Then, when an angle formed between the platen cover and the platen glass 561 is detected to be γ° (steps S23 and 24); the image input apparatus 101 carries out pre-scanning of the document on the platen glass 561. On reception of first input image data obtained by carrying out the pre-scanning, a document skew detection section 114 detects an angle θ1 in FIG. 9(b) in accordance with the first input image data (step S25).

After completely closing the platen cover, the user then presses down a button so as to input a copy command (step S26). This causes the image input apparatus 101 to carry out actual scanning of the document on the platen glass 561 (step S27). Correction target image data, data obtained by the actual scanning, is processed with an image quality adjustment process by an input tone correction section 106, and then stored in an image memory 120 (step S28).

Then, the document skew detection section 114 detects a skew angle $\theta_2$ in accordance with a document image in an image shown by the correction target image data stored in the image memory 120 (step S29). Further, the document skew detection section 114 calculates an angular difference α by putting the angle $\theta_1$, which is obtained at the step S25, and the angle $\theta_2$, which is obtained at the step S29, into an equation 2 (step S30).

Figure 26:
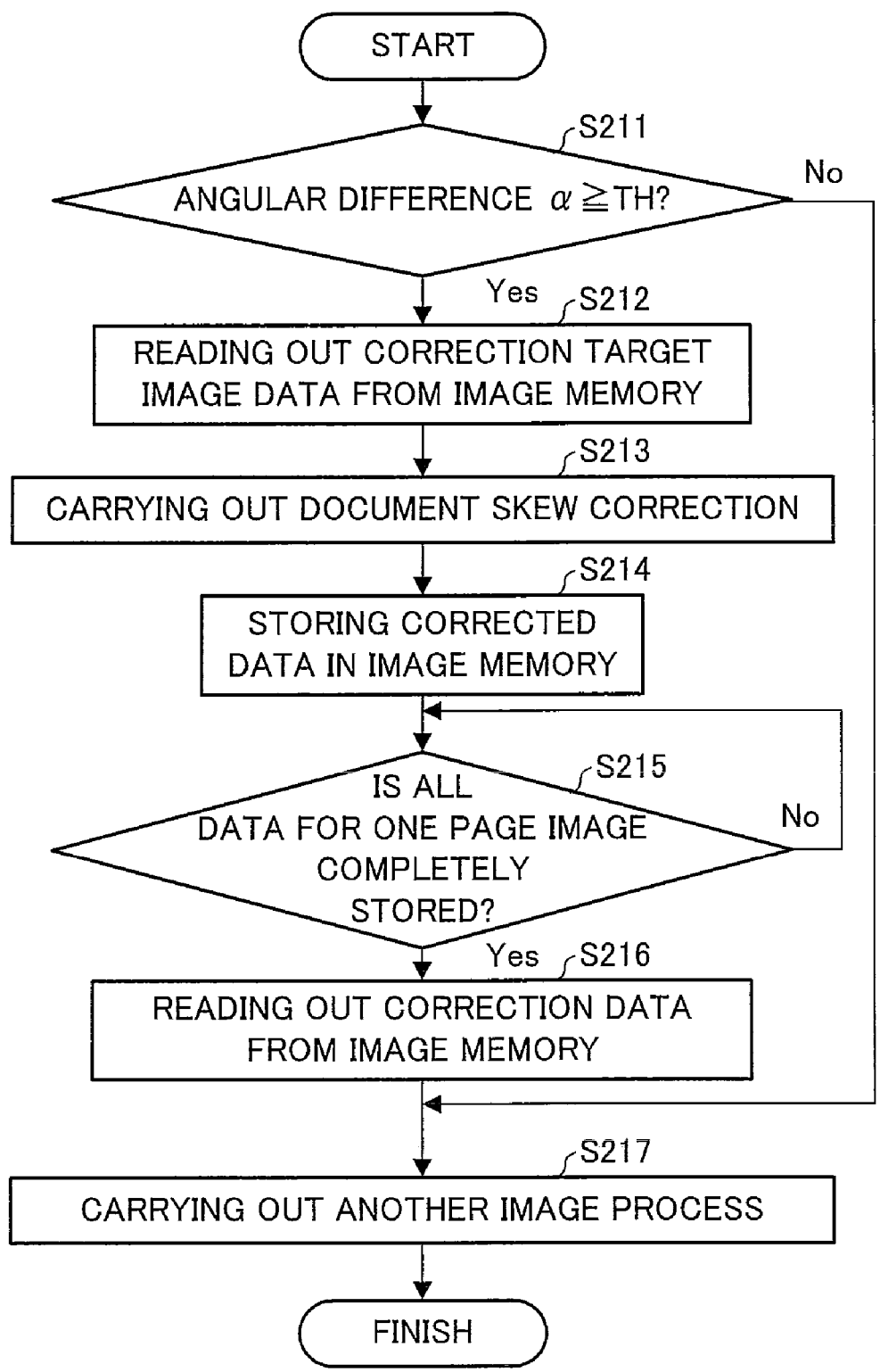
FIG. 26 is a flow chart showing a process flow in the document skew correction section in accordance with Second Embodiment of the present invention.
Figure 27:
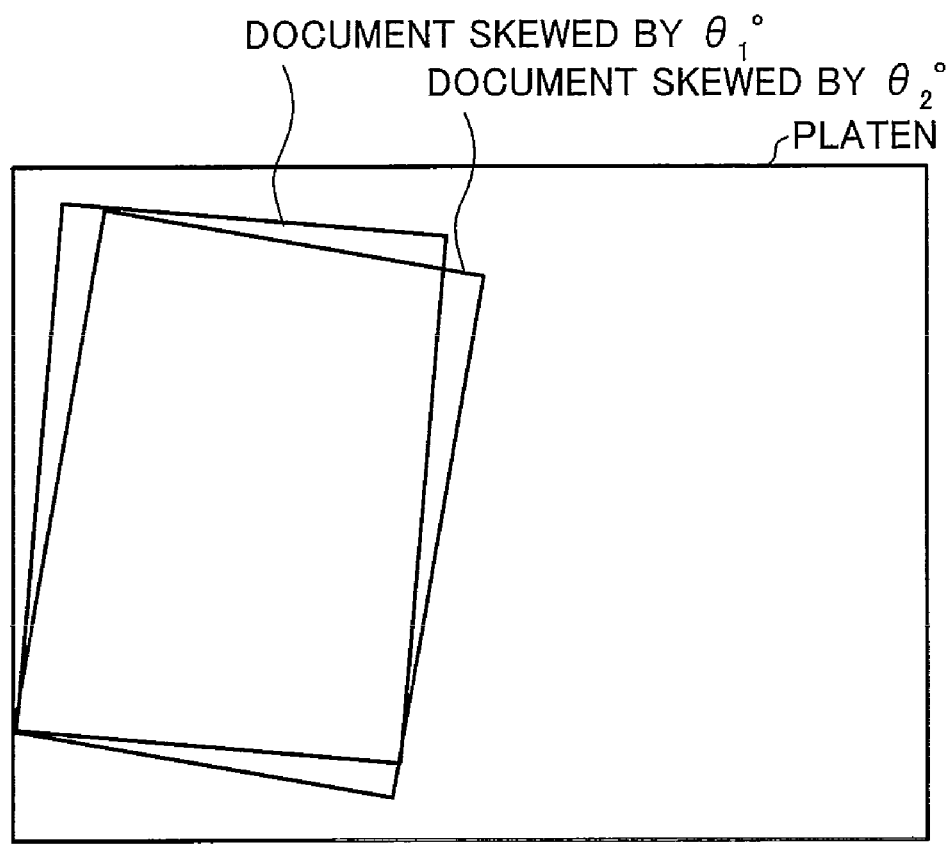
FIG. 27 is a view showing an image to be displayed on a monitor included by the copying machine, showing documents one of which is skewed by an angle $θ_1$ and the other of which is skewed by an angle $θ_2$.

Processes to be carried out after a step S30 are explained with reference to a flow chart in FIG. 26. FIG. 26 is the flow chart showing a process flow in a document skew correction section 107 in accordance with Second Embodiment. After the step 30 in FIG. 25, the document skew correction section 107 compares the angular difference α calculated at the step S30 with a threshold value TH (step S211). In a case where the angular difference $\alpha \geqq$ the threshold value TH (i.e., in a case where the process is advanced to YES at the step S211), the document skew correction section 107 reads out the correction target image data from the image memory 120 (step S212), and carries out the document skew correction with respect to the correction target image data read out (step S213). The document skew correction section 107 then sequentially stores the data processed with the document skew correction into the image memory 120 (step S214). After all of the correction target image data for one page image obtained by carrying out one actual scanning is stored in the image memory 120 (i.e., after the process is advanced to YES at the step 215), the correction target image data is read out from the image memory 120 (step S216), and then processed with an image process other than the document skew correction (step S217).

According to the operating procedure of Second Embodiment shown above, the pre-scanning is carried out one time only, and the angular difference α is calculated in accordance with the first input image data, which is obtained by carrying out the pre-scanning, and the correction target image data, which is obtained by carrying out the actual scanning. As such, with an arrangement of Second Embodiment, it is possible to carry out (i) decreasing of a process time, (ii) reducing of a load on a computer carrying out processes, and (iii) the like more as compared with First Embodiment.

Merit of Second Embodiment is explained in more detail below. In a case where correction target image data, first input image, and second input image data are created by respective scanning, as in the case of First Embodiment, it is necessary to carry out scanning for three times in total. That is, in this case, the first input image data are created by carrying out first pre-scanning, the second input image data are created by carrying out second pre-scanning, and the correction target image data are created by carrying out actual scanning. According to Second Embodiment, on the other hand, correction target image data to be created by carrying out actual scanning are also used as the second input image data, thereby eliminating the need for separately creating second input image data. This brings about an effect that makes it possible to decrease the number of scanning and to reduce a processing time and an electrical power consumption.

Second Embodiment also can be arranged such that the document skew correction is carried out not only in a case where the angular difference $\alpha \geqq$ the threshold value TH, but also in a case where the angular difference $\alpha \neq 0$.

Third Embodiment

The following explains a configuration in which: an image processing apparatus 102' is divided into a preceding process section 102a and a following process section 102b; outputting from the preceding section 102a is stored in an image storing apparatus (hard disk) 200; data read out from the image storing apparatus 200 is processed as input data to the following process section 102b; and a process for outputting an image is eventually carried out. It is to be noted that a description of same content as in First Embodiment is omitted below.

The preceding process section 102a stores, in an image storing apparatus 200, data processed by an input tone correction section 106 (correction target image data obtained by carrying out actual scanning). If a document skew correction mode is selected in this case, (i) first input image data obtained by carrying out first pre-scanning and (ii) second input image data obtained by carrying out second pre-scanning are sent to a document skew detection section 114. The document skew detection section 114 then calculates an angular difference α in accordance with the first and the second input image data, and stores it, in association with correction target image data, in the image storing apparatus 200.

On the other hand, the following process section 102b reads out: the correction target image data, processed with the input tone correction process and stored in the image storing apparatus 200; and the angular difference α, stored in association with the correction target image data. The following process section 102b then sequentially stores a result of a coordinate transformation in the document skew correction section 107 into the image memory connected with the following process section 102b.

A segmentation process section 108 carries out a segmentation process to the data processed with the skew correction and stored in the image memory. Each of process sections following the segmentation process section 108 advances a process in a pipe line manner.

With an arrangement of Third Embodiment described above, it is possible that the preceding process section 102a and the following process section 102b advance their processes asynchronously with each other. As such, it possible, for example, that the angular difference α, outputted from the preceding process section 102a, and the correction target image data are temporarily stored in the image storing apparatus 200. This makes it possible to separately carry out the document skew correction to the stored correction target image data in accordance with necessity, and to carry out print out.

Fourth Embodiment

Figure 24:
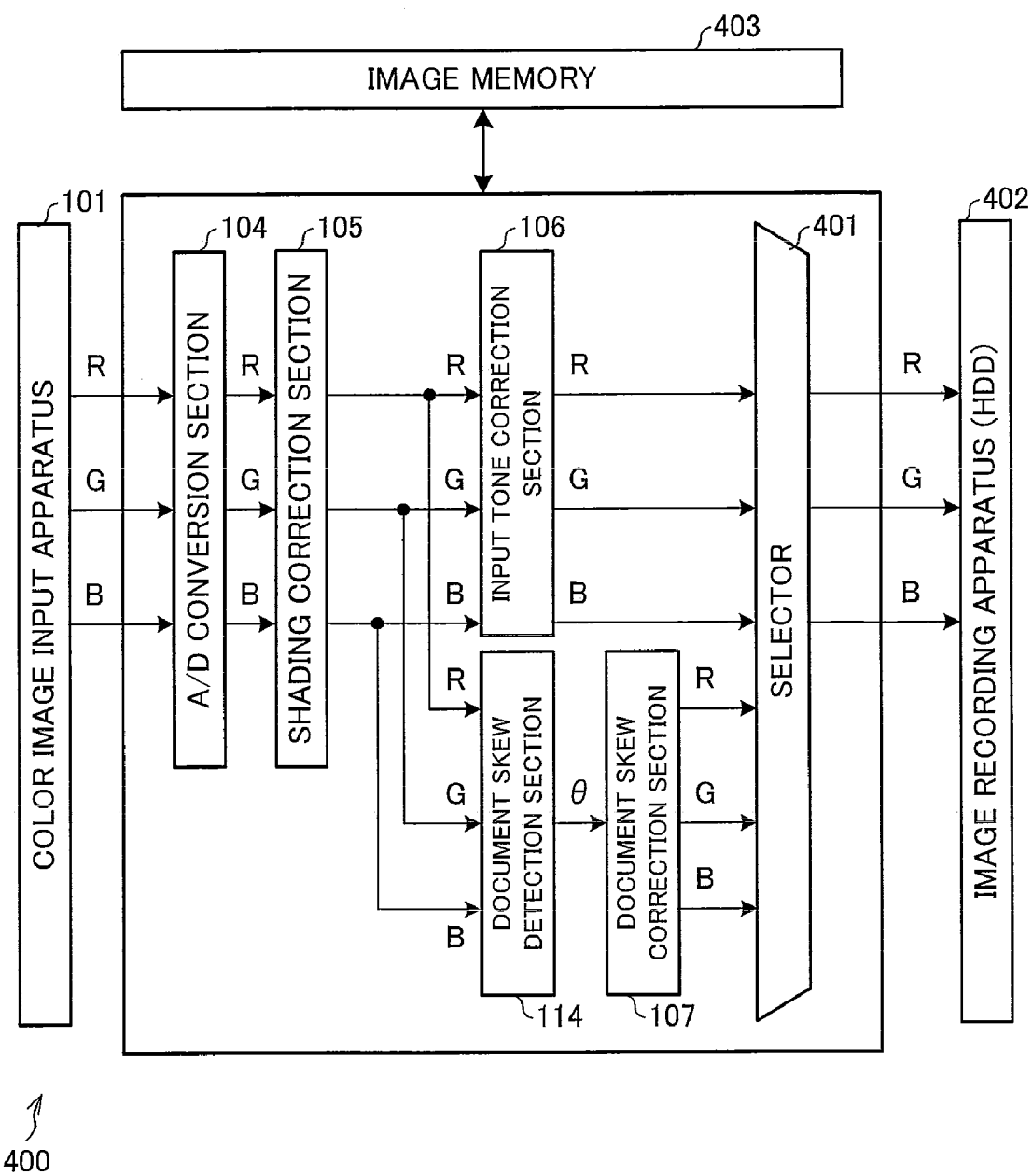
FIG. 24 is a block diagram showing a scanner dedicated machine in accordance with Fourth Embodiment of the present invention.

A document skew detection section 114 and a document skew correction section 107 can be included by a scanner dedicated machine (image reading apparatus). FIG. 24 is a block diagram showing a scanner dedicated machine 400 in accordance with Fourth Embodiment.

As shown in FIG. 24, the scanner dedicated machine 400 includes an image input apparatus 101, an A/D conversion section 104, a shading correction section 105, an input tone correction section 106, a document skew detection section 114, and a document skew correction section 107. Because basic functions of above devices or blocks are same as in First Embodiment, explanations thereof are omitted.

In the scanner dedicated machine 400, in a case where a document skew correction mode is selected, a document skew detection section 114 calculates an angular difference α in accordance with first and second input image data each obtained from carrying out pre-scanning. Further, in the case where the document skew correction mode is selected, correction target image data to be obtained by carrying out actual scanning is processed in the input tone correction section 106, and then temporarily stored in an image memory 403. Subsequently, the document skew correction section 107 (i) reads out the correction target image data from the image memory 403, (ii) carries out the skew correction (coordinate transformation) to the correction target image data read out, and (iii) write the correction target image data into the image memory 403 again.

Furthermore, after the document skew correction is carried out to the correction target image data for one page image which is obtained by carrying out one actual scanning, a control section, which is not illustrated, reads out the correction target image data processed with the document skew correction from the image memory 403, and sends the data to the image storing apparatus 402. A selector 401 in FIG. 24 functions so as to select either one of (i) the correction target image data processed with the input tone correction and (ii) the correction target image data processed with the document skew correction process, and to send selected one of the data to the image storing apparatus 402.

Furthermore, it can be arranged such that the correction target data which have been processed with the document skew correction be sent to a member, such as a computer, a server, a digital multifunction printer, a printer, or the like, being connected with the scanner dedicated machine 400 via a network, instead of being sent to the image storing apparatus 402. Further, selection of the document skew correction mode can be carried out on an operation panel of the scanner or can be carried out in a setting window for a scanner driver of the computer (a setting screen for reading requirements of the scanner) by use of a mouse or a keyboard.

Fifth Embodiment

Each of the copying machines 100 in accordance with First through Fourth Embodiments is caused to start first pre-scanning of a document placed on a platen glass 561, when an angle to be formed by a platen glass 561 and a platen cover becomes γ° (γ>0) after the user starts closing the platen cover.

In a case where the user intentionally or unintentionally reopens the halfway closed platen cover after the first pre-scanning is started, the first pre-scanning can be canceled (reset) or first input image data to be obtained by carrying out the first pre-scanning can be canceled (reset). Such an arrangement allows the user to start over the first pre-scanning with ease even after the first pre-scanning is carried out, and thereby to use only data obtained by carrying out the pre-scanning which is started to be carried out when a condition (a skew degree or the like) of the document is set as close to an condition intended by the user as possible.

Examples of the case in which the user voluntarily or involuntarily reopens the halfway closed platen cover include (i) a case in which the user repeatedly opens and closes the platen cover in such a manner that the angle formed by the platen glass 561 and the platen cover changes around γ°, and (ii) a case in which the user returns the platen cover to be a fully open state.

Furthermore, in a case where the first pre-scanning is canceled or the first input image data are canceled, a message that "please reset the document on the platen glass 561, and close the platen cover" can be announced or shown by the display device or the like.

Next, the following describes a method for detecting reopening of the halfway closed platen cover when the halfway closed platen cover is reopened after the first pre-scanning is started. It is to be noted that, in the following description, an angle detection mechanism for detecting the angle formed by the platen glass 561 and the platen cover is a linear encoder 300.

In a case where the user reopens the halfway closed platen cover so as to check a condition of the document, photosensors 301 and 302 receive a light for more times and for a longer period. In view of this, (i) the number of light reception and (ii) a total of light reception periods by each of the photosensor 301 and 302 should be monitored, and compared with threshold values TH2 and TH3 (e.g., threshold value TH2=7 times, threshold value TH3=500 msec), respectively, which are set for the number of light reception and the total of light reception periods, so as to detect opening of the halfway closed platen cover. That is, in a case where the number of light reception and the total of light reception periods are greater than the respective threshold values, it is judged that (i) the platen cover is repeatedly opened and closed in such a manner that the angle formed by the platen glass 561 and the platen cover changes around the angle γ or (ii) the platen cover is returned to be a fully open state, and then, the first prescanning or the first input image data should be canceled based on judgment.

However, depending on an angle of the platen cover formed when the platen cover is reopened, there may an occasion where (i) the case in which the platen cover is reopened and (ii) the case in which the platen cover is completely closed without being reopened are same with each other in terms of the number of light reception and the total of light reception periods by each of the photosensors 301 and 302. This can causes a problem in that those two cases cannot be distinguished from each other. In order to prevent such a problem, an actuator should be changed from an actuator 303 shown in each of FIGS. 17, 18, and 28 to an actuator 303a shown in FIG. 28.

Figure 28:
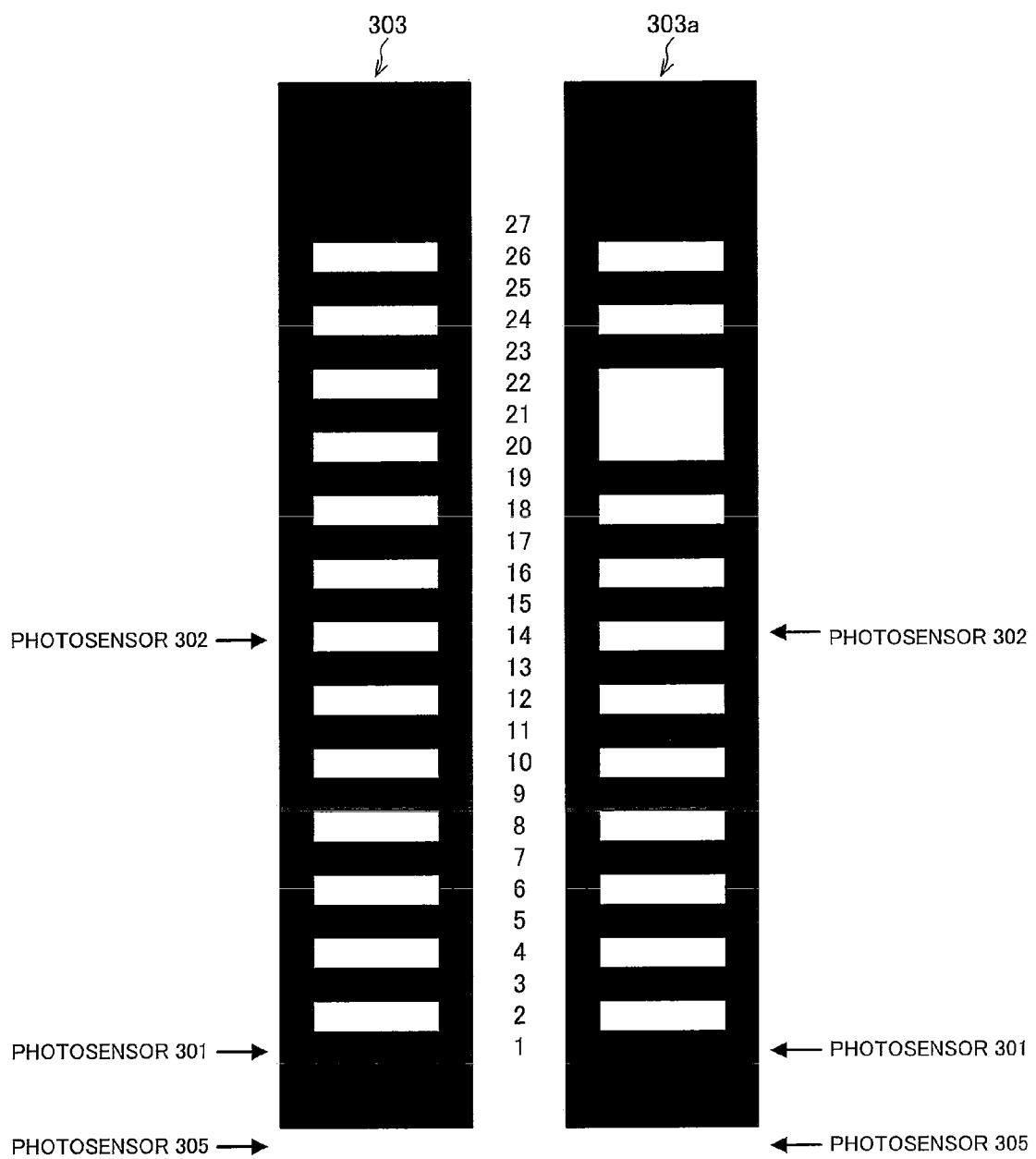
FIG. 28 is a view showing actuators, each of which is included by the linear encoder.

As shown in FIG. 28, the actuator 303a is configured such that some of slits have a width wider than the others (in the actuator 303, all slits have a same width with one another)

Figure 29:
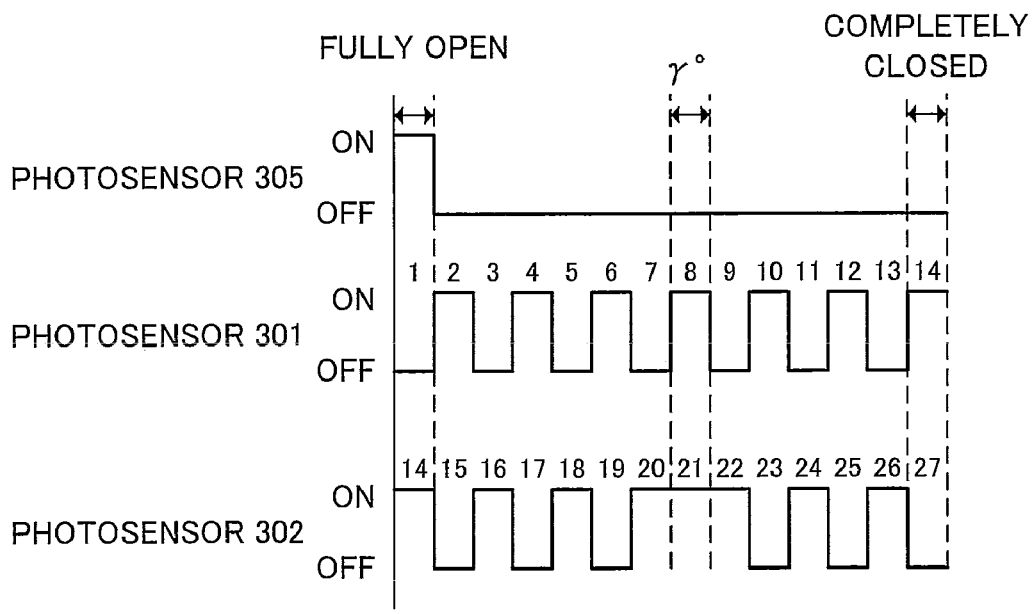
FIG. 29($a$) is a chart showing waveforms of output signals from respective photosensors of the linear encoder, the linear encoder including an actuator in which slits, some being wider than the other, are formed.
Figure 29:
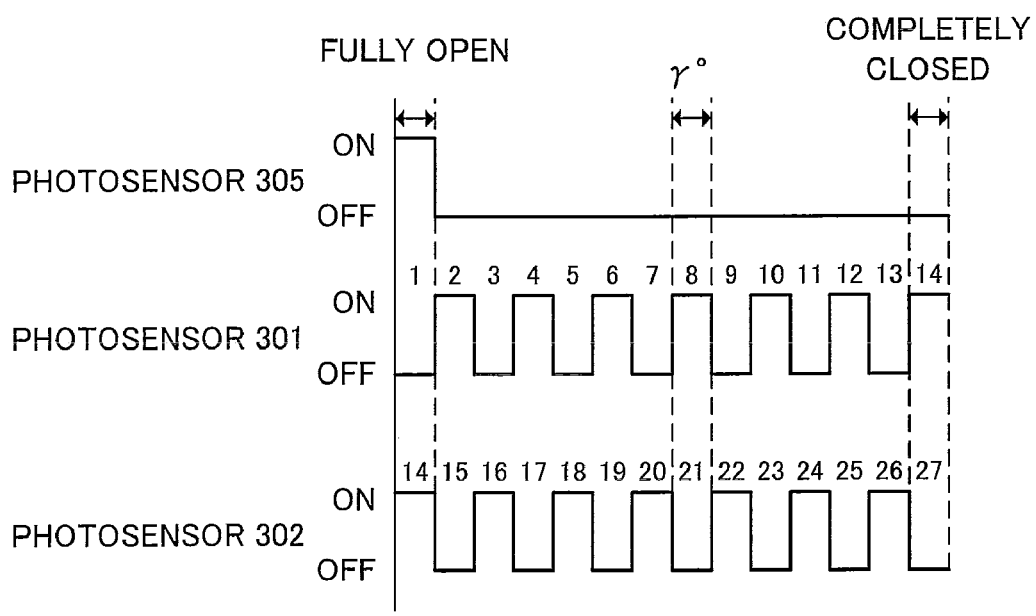

In the linear encoder 300 including the actuator 303, output signals from the photosensors have waveforms as shown in FIG. 29(b), respectively, whereas in a linear encoder 300 including the actuator 303a, output signals from photosensors have waveforms as shown in FIG. 29(a), respectively. As is clear from FIG. 29(a), it is possible to judge that the platen cover is reopened after being halfway closed (after being closed to form at least an angle γ), in a case where (i) a plurality of waveforms, each having a relatively long ON period, is detected in the outputting from the photosensor 302 after the fully open state of the platen cover is detected and before the completely closed state of the platen cover is detected, or (ii) two or more periods, in each which both the outputting from the photosensors 301 and that from the photosensor 302 are turned on, are detected.

As shown in each of FIGS. 29(a) and 29(b), in a case where the platen cover is fully opened, an output from the photosensor 305 is turned on. In view of this, the process should be returned to an initial state when the output from the photosensor 305 is turned on again (i.e., the process should be returned to a state shown by "start" of the flow in FIG. 12).

Sixth Embodiment

The present invention can be realized by storing, in a computer-readable recording medium, a program code (an execution format program, an intermediate code program, a source program) for causing a computer to carry out the processes by the document skew detection section 114 and the document skew correction section 107. This makes it possible to provide a portable recording medium in which the program for causing a computer to carry out the processes by the document skew detection section 114 and the document skew correction section 107 is stored.

In the present embodiment, the recording medium (program medium) may be a memory (not illustrated), such as a ROM, used in processing of a microcomputer. Further, the recording medium may be such a program medium that (i) a program reading apparatus is provided as an external apparatus (not illustrated), and (ii) the recording medium is inserted into the program reading apparatus so that the program can be read.

In any cases, it is possible to have an arrangement in which a microprocessor accesses a stored program code so as to perform the program code. Alternatively, in any cases, it is possible to have an arrangement in which (i) the program code is read out and downloaded to a program storage area (which is not illustrated) of a microcomputer, and (ii) the program code is performed. A program that is used to download the program code is stored in a main apparatus in advance.

Here, the program medium may be a recording medium that is arranged separable from a main apparatus. The program medium may be a medium in which a program code is supported and fixed, such as: a tape (a magnetic tape or a cassette, for example); a disc such as a magnetic disk (a floppy disk, or a hard disk, for example) or an optical disk (a CD-ROM, an MO, an MD, or a DVD, for example); a card (such as an IC card (including a memory card) or an optical card); or a semiconductor memory (such as a mask ROM, an EPROM (Erasable Programmable Read Only Memory), an EEPROM (Electrically Erasable Programmable Read Only Memory), or a flash ROM).

Further, a system of the multifunction printer 100 of the present embodiment may be arranged such that (i) the system can be connected to a communication network including the Internet, and (ii) the program code may be supported but not fixed in a medium (the program code may be downloaded from a communication network, for example). It should be noted that in a case where the program code is downloaded from a communication network, the program for downloading the program may be stored in the main apparatus in advance, or may be installed to the main apparatus from another recording medium. Note that the present invention can also be realized in the form of a computer data signal realized by electronic transmission of the program code and embedded in a carrier wave. Moreover, the image processing method described above is carried out in such a manner that the program stored in the recording medium is read by a program reading apparatus included in a digital color image forming apparatus or a computer system.

Further, a computer system includes: an image input apparatus, such as a flathead scanner, a film scanner, or a digital camera; a computer in which a predetermined program is loaded so as to carry out various processing, such as the image processing method described above; an image display apparatus for displaying a result of the processes by the computer; such as a CRT display or a liquid crystal display; and a printer for outputting the result of the processes by the computer on, for example, a sheet. Furthermore, the computer system includes a network card or a modem, as communication means for connecting, via a network, the computer system to a server or the like.

As described hereinabove, the image processing apparatus of the present invention includes: a first angle specifying section for specifying a first angle formed between a reference direction and an edge of a document placed on a scanner platen, in accordance with first image data obtained by scanning the document, the document being started to be scanned when a positional relation between the scanner platen and a platen cover for covering the document is in a first state; a second angle specifying section for specifying a second angle formed between the reference direction and the edge of the document, in accordance with second image data obtained by scanning the document, the document being started to be scanned when the positional relation is in a second state where a distance between the platen and the platen cover is narrower in the second state than in the first state; and an angle information generation section for generating angular information which indicates a degree of a difference between the first and the second angles.

According to the present invention, if the document on the scanner platen is not moved at all as the platen cover is closed, the difference between the first and the second angles is 0, in either case where the document is placed on the platen in such a manner that the edge of the document is set along the reference direction, or where the document is placed on the scanner platen in such a manner that the edge (of the document) is intentionally skewed with respect to the reference direction by the user.

In contrast, if the document on the scanner platen is moved by a wind pressure, shaking, or the like caused as the scanner cover is closed (if the document is unintentionally skewed), the difference between the first and the second angles is emerged, in either case where the document is placed on the scanner in such a manner that the edge of the document is set along the reference direction, or where the document is placed on the scanner platen in such a manner that the edge (of the document) is intentionally skewed with respect to the reference direction by the user.

As such, with the present invention, it is possible to identify the document which is unintentionally skewed, by referring to the angular information generated by the angular information generation section.

It is to be noted that the angular information is not limited as long as the angular information is a value which indicates a degree of the difference between the first and the second angles. Examples of the angular information may include: the difference between the first and the second angles itself; a value obtained by rounding the difference between the first and the second angles; and a value obtained by multiplying or dividing the difference between the first and the second angles by a steady value. Further, a ratio between the first and the second angles or the like can be used as the value indicating a degree of the difference between the first and the second angles.

Furthermore, in addition to being configured as described earlier, the image processing apparatus of the present invention may be configured so as to include the document skew correction section, which (i) receives correction target image data obtained by scanning the document placed on the scanner platen, the document being started to be scanned when or after the positional relation between the scanner platen and the scanner cover is in the second state, and (ii) carries out a first rotation process with respect to the correction target image data so that the correction target image data is rotated, in accordance with the angular information, by an angle equal to the difference between the first and the second rotation process.

In a case where the document on the platen is moved by a wind pressure, shaking, or the like caused as the platen cover is closed, the configuration brings about an effect that makes it possible to correct the skew which is caused as the platen cover is closed. Further, because the configuration does not correct the skew which is intentionally caused by the user, it is possible that the unnecessary skew correction be prevented from being carried out.

Furthermore, according to the configuration, in a case where the document, which has been placed on the platen in such a manner that the edge (of the document) is intentionally skewed with respect to the reference direction by the user, is further skewed by a wind pressure, shaking, or the like caused as the scanner cover is closed, the skew which is caused as the platen cover is closed is corrected, whereas the skew which is intentionally caused by the user is not corrected.

As such, even in the case where the document, which has been placed on the platen in such a manner that the edge (of the document) is intentionally skewed with respect to the reference direction by the user, is further skewed by the wind pressure, the shaking, or the like caused as the platen cover is closed; it is possible that the skew of the document, which is intentionally caused by the user, is accurately reproduced in an image subjected to the correction.

Furthermore, besides being configured as described earlier, the image processing apparatus of the present invention may be configured so as to include a first judgment section for judging whether or not the difference between the first and the second angles is greater than or equal to a first threshold value in accordance with the angular information, the document skew correction section carrying out the first rotation process in a case where the difference between the first and the second angles is judged to greater than or equal to the first threshold value. With the configuration, it is possible, for example, that no skew correction not carried out in a case where the skew is insignificant (no first rotation process is carried out), and that the skew correction is carried out (the first rotation process is carried out) only in a case where the skew is significant.

It is to be noted that, in the specification of the present application, "judgment of whether or not a judgment target value is greater than or equal to a threshold value" includes both "judgment of whether the judgment target value≧the threshold value or not" and "judgment of whether the judgment target value>the threshold value or not".

In a case where the document is intentionally skewed by the user, it is to be assumed that the document is placed in such a manner that the skew is detectable. In view of this, in a case where the skew of the document in the first state is remarkably small, it is more likely that the skew of the document is caused by the wind pressure, the shaking, or the like than that the skew is intentionally caused by the user. As such, besides being configured as described earlier, the image processing apparatus of the present invention may be configured so as to include a second judgment section for judging whether or not the first angle is less than or equal to a second threshold value, in a case where the second judgment section judges that the first angle is less than or equal to the second threshold value, the document skew correction section carrying out a second rotation process, instead of the first rotation process, to the correction target image data, in which second process the first angle is a rotation angle. This makes it possible that, depending on a case, the skew of the document be corrected before carrying out the process for specifying the second angle, thereby allowing a reduction of a process time.

It is to be noted that, in the specification of the present application, "judgment of whether or not a judgment target value is less than or equal to a threshold value" includes both "judgment of whether the judgment target value≦the threshold value or not" and "judgment of whether the judgment target value<the threshold value or not".

In the image processing apparatus of the present invention, in a case where the correction target image data, the first image data, and the second input image data are individually created by respective scanning (reading of the document), a total of three scanning is required to be carried out. That is, in this case, the first image data are created by carrying out the first pre-scanning, the second image data are created by carrying out the second pre-scanning, and the correction target image data are created by carrying out the actual scanning. On the other hand, in a case where it is configured such that the second image data are supplied to the document skew correction section as the correction target image data, the configuration brings about an effect that allows decrease in the number of scanning, a reduction in a process time, and a reduction in an electrical power consumption.

Furthermore, it is preferable that the image processing apparatus of the present invention be configured such that the second state is a state in which the document placement surface of the scanner platen is closed by the scanner cover. This makes it possible that a skew degree of the document which is skewed unintentionally to the user be more accurately detected.

Furthermore, the image reading apparatus of the present invention is configured so as to include: the image processing apparatus; the scanner platen; the scanner cover; and the reading section for carrying out the reading of the document and outputting image data. Further, besides being configured as described above, it is preferable that the image reading apparatus of the present invention be configured so as to include a detection section for detecting the angle formed between the scanner platen and the scanner cover for covering the document placed on the scanner platen, the reading section starting reading out the document when the detection section detects a first setup angle, and then outputting the first image data, and the reading section starting reading out the document when the detection section detects a second setup angle narrower than the first setup angle, and then outputting the second image data.

With the configuration, it is possible that the reading section carries out: the outputting of the first image data which are obtained by reading out the document once the positional relation between the paten and the paten cover is in the first state; and the outputting of the second image data which are obtained by reading out the document once the positional relation between the platen and the paten cover is in the second state narrower that the first state.

Furthermore, it is preferable that, besides being configured as described earlier, the image reading apparatus of the present invention be configured such that the detection section is an optical rotary encoder or an optical linear encoder. Because such an optical encoder is a high-resolution encoder, it is possible, with the configuration, that the angler formed between the platen and the paten cover be accurately detected.

Furthermore, with the configuration, it is possible that degrees of freedom for setup values of the first and the second setup angles be increased, thereby making it easier that the setup values of the first and the second setup angles be set in accordance with a usage pattern of the user. For example, it is preferable that a setup value of a second setup angle in the image reading apparatus, whose user carries out opening and closing of the paten cover quickly, be 0 or close to 0, because quick opening and closing of the scanner cover is more likely to move the document by a wind pressured to be caused as the paten cover is closed.

Furthermore, because the first image data are data to be used in specifying the first angle, it is unnecessary that the first image data be data which show an entire part of the document, as long as the first data be data which show the edge of the document. As such, it is preferable that, besides being configured as described earlier, the image reading apparatus of the present invention be configured such that the reading section reads out a part of the entire part of the document, in which part the edge of the document is included, and then carries out outputting of the first image data. This allows: a reduction of time required for carrying out scanning; a reduction of time required for processing the first image data; an electrical power saving; and a reduction of a process time.

The reading section for reading out the document placed on the platen generally includes the scanning units, which concentrate a reflected light from the document on a line sensor as they travel. General scanning units usually travel back and forth one time per one scanning, yet no scanning is carried out when the scanning units travel back. As such, usually, in a case where the reading section carries out two scanning, it is necessary that the scanning units travel back and force two times.

The mage processing apparatus of the present invention includes, in addition to the configuration above, the scanning units which concentrate, as they travel, a light reflected from the document on a line sensor when the document is read out. The scanning units are configured so as to travel in a given direction when the reading of the document is carried out in order that the first image data are outputted, and to travel in a direction opposite to the given direction when the reading of the document is carried out in order that the second image data are outputted. According to the configuration, when the scanning units travel back and forth one time, it is possible that both the first and the second image data be outputted, thereby allowing a reduction of a process time and saving of electrical power consumption.

Furthermore, it is required for the image reading apparatus of the present invention that the document reading for outputting of the first image data be carried out at a high speed, in order that both (i) the document reading for outputting of the first image data and (ii) that for outputting of the second image data are carried out while the paten cover is being closed. As such, it is preferable that (i) a travel speed at which the scanning units travel while reading the document for outputting of the first image data and (ii) a travel speed at which the scanning units travel while reading the document for outputting of the second image data be different from each other. In specific, it is preferable that the travel speed at which the scanning units travel while reading the document for outputting of the first image data be increased, and that the travel speed at which the scanning units travel while reading the document for outputting of the second image data be decreased. This may slightly lower a resolution of the first image data (the image becomes slight rougher), but can increase a resolution of the second image data, thereby substantially maintaining an accuracy of the angular information obtained from the first and the second image data.

Furthermore, it is preferable that the image reading apparatus of the present invention, which includes: the image processing apparatus; the scanner platen; the scanner cover; and the reading section for reading the document and then outputting the image data, be configured to further include the mode control section for switching a mode between the document skew correction mode and the non-correction mode, in the document skew correction mode the first angle specifying section, the second angle specifying section, the angular information generation section, and the document skew correction section are activated, whereas in the non-correction mode none of the sections above are activated.

According to such a configuration, in a case where the document skew correction is unnecessary, the non-correction mode is set. This makes it possible to skip the document reading or the like for creating the first and the second image data, thereby allowing saving of an electrical power consumption and prevention of wearing of the apparatus. In a case where the document is a thin paper, it is more likely that the document is moved as the paten cover is closed. As such, for example, it is preferable that the document skew correction mode be selected when reading of the thin paper is carried out.

Furthermore, the invention can be the image forming apparatus which include the image reading apparatus. Further, the image processing method of the present invention includes steps of: specifying a first angle formed between a reference direction and an edge of a document placed on a platen, in accordance with first image data obtained by reading out the document, the document being started to be read out when a positional relation between (i) the platen and (ii) a platen cover for covering the document is in a first state; specifying a second angle formed between the reference direction and the edge of the document in accordance with second image data obtained by reading out the document, the document being started to be read out when the positional relation between the platen and the platen cover is in a second state narrower than the first state; and generating angular information which indicates a degree of a difference between the first and the second angles.

Furthermore, the image processing apparatus of the present invention can be realized by a computer. In this case, the scope of the present invention includes: the image processing program for operating the computer as the first and the second angle specifying sections and the angular information generation section; and the computer-readable recording medium which records the above program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The image processing apparatus of the present invention is suitable in a copying machine, a multifunction printer, and a scanner.

What is claimed is:

1. An image processing apparatus, comprising:
a first angle specifying section for specifying a first angle formed between a reference direction and an edge of a document to be placed on a platen, in accordance with first image data obtained by scanning the document, the document being started to be scanned when a positional relation between the platen and a platen cover for covering the document is in a first state;
a second angle specifying section for specifying a second angle formed between the reference direction and the edge of the document, in accordance with second image data obtained by scanning the document, the document being started to be scanned when the positional relation is in a second state where a distance between the platen and the platen cover is narrower than in the first state; and
an angle information generation section for generating angular information which indicates a degree of a difference between the first and the second angles.

2. The image processing apparatus as set forth in claim 1, further comprising a document skew correction section,
the document skew correction section (i) receiving correction target image data obtained by scanning the document, the document being started to be scanned when or after the positional relation between the platen and the platen cover is in the second state, and (ii) carrying out a first rotation process with respect to the correction target image data so that the correction target image data is rotated; in accordance with the angular information, by an angle equal to the difference between the first and the second angles.

3. The image processing apparatus as set forth in claim 2, further comprising a first judgment section for judging in accordance with the angular information whether or not the difference between the first and the second angles is greater than or equal to a first threshold value,
in a case where the difference between the first and the second angles is judged to be greater than or equal to the first threshold value by the first judgment section, the document skew correction section carrying out the first rotation process.

4. The image processing apparatus as set forth in claim 2, further comprising a second judgment section for judging whether or not the first angle is less than or equal to a second threshold value,
in a case where the first angle is judged to be less than or equal to the second threshold value, the document skew correction section carrying out a second rotation process, instead of the first rotation process, with respect to the correction target image data so that the correction target image data is rotated by the first angle.

5. The image processing apparatus as set forth in claim 2, wherein the document skew correction section receives the second image data as the correction target image data.

6. The image processing apparatus as set forth in claim 1, wherein the second state is a state in which a document placement surface of the platen is covered by the platen cover.

7. A computer readable recording medium, in which an image processing program for controlling an image processing apparatus as set forth in claim 1 and for causing a computer to function as each of the sections of the image processing apparatus is stored.

8. An image reading apparatus, comprising:
a platen;
a platen cover for covering a document which is placed on the platen;
a reading section for reading out the document so as to output image data; and
an image processing apparatus which includes:
(i) a first angle specifying section for specifying a first angle formed between a reference direction and an edge of the document, in accordance with first image data obtained by scanning the document, the document being started to be scanned when a positional relation between the platen and the platen cover is in a first state;
(ii) a second angle specifying section for specifying a second angle formed between the reference direction and the edge of the document, in accordance with second image data obtained by scanning the document, the document being started to be scanned when the positional relation is in a second state where a distance between the platen and the platen cover is narrower than in the first state; and (iii) an angular information generation section for generating angular information which indicates a degree of a difference between the first angle and the second angles.

9. The image reading apparatus as set forth in claim 8, further comprising a detection section for detecting an angle formed between the platen and the platen cover, the reading section reading out the document, the document being started to be read out when the detection section detects a first setup angle, so as to output the first image data, and the reading section reads out the document, the document being started to be read out when the detection section detects a second setup angle narrower than the first setup angle, so as to output the second image data.

10. The image reading apparatus as set forth in claim 9, wherein the detection section is an optical rotary encoder or an optical linear encoder.

11. The image reading apparatus as set forth in claim 8, wherein:

the reading section reads out a part of an entire region of the document, the part including the edge of the document, so as to output the first image data.

12. The image reading apparatus as set forth in claim 8, wherein:

the reading section includes scanning units for moving, and for directing light reflected from the document onto a line sensor while the reading section reads out the document, and the scanning units move in a given direction in a case where the reading section reads out the document so as to output the first image data, whereas move in a direction reverse to the given direction in a case where the reading section reads out the document so as to output the second image data.

13. The image reading apparatus as set forth in claim 8, wherein:

the reading section includes scanning units for moving, and for directing light reflected from the document onto a line sensor while the reading section reads out the document, and the reading section causes a speed, at which the scanning units move while the reading section reads out the document so as to output the first image data, to be different from a speed at which the scanning units move while the reading section reads out the document so as to output the second image data.

14. The image reading apparatus as set forth in claim 8, wherein:

the image processing apparatus includes a document skew correction section which (i) receives correction target image data obtained by scanning the document placed on the platen, the document being started to be scanned when or after a positional relation between the platen and the platen cover is in the second state, and (ii) carries out a first rotation process with respect to the correction target data so that the correction target image data is rotated, in accordance with the angular information, by an angle equal to the difference between the first and the second angles, said image reading apparatus, further comprising:

a mode control section which causes a mode to be switched between a document skew correction mode and a document non-correction mode, the document skew correction mode causing the first angle specifying section, the second angle specifying section, the angular information generation section, and the document skew correction section to be operated, whereas the document non-correction mode causing none of the first angle specifying section, the second angle specifying section, the angular information generation section, and the document skew correction section to be operated.

15. An image forming apparatus, comprising:

an image reading apparatus which includes:

a platen:

a platen cover for covering a document which is placed on the platen;

a reading section for reading out the document so as to output image data; and an image process apparatus which includes:

(i) a first angle specifying section for specifying a first angle formed between a reference direction and an edge of the document, in accordance with first image data obtained by scanning the document, the document being started to be scanned when a positional relation between the platen and the platen cover is in a first state, (ii) a second angle specifying section for specifying a second angle formed between the reference direction and the edge of the document, in accordance with second image data obtained by scanning the document, the document being started to be scanned when the positional relation is in a second state where a distance between the platen and the platen cover is narrower than in the first state, (iii) an angular information generation section for generating angular information which indicates a degree of a difference between the first and the second angles.

* * * * *